US012650674B2

(12) United States Patent
Sardiga et al.

(10) Patent No.: US 12,650,674 B2
(45) Date of Patent: Jun. 9, 2026

(54) SYSTEMS AND METHODS FOR MANUFACTURING APPLICATIONS

(71) Applicant: Rockwell Automation Technologies, Inc., Mayfield Heights, OH (US)

(72) Inventors: Kurt Sardiga, Cleveland, OH (US); Sajid S. Patel, Solon, OH (US); Lion Moeliono, Twinsburg, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 425 days.

(21) Appl. No.: 18/373,140

(22) Filed: Sep. 26, 2023

(65) Prior Publication Data

US 2025/0103022 A1    Mar. 27, 2025

(51) Int. Cl.
| | |
|---|---|
| *G05B 19/408* | (2006.01) |
| *G06Q 10/0633* | (2023.01) |
| *G08B 5/36* | (2006.01) |
| *G08B 21/18* | (2006.01) |

(52) U.S. Cl.
CPC ..... *G05B 19/4083* (2013.01); *G06Q 10/0633* (2013.01); *G08B 5/36* (2013.01); *G08B 21/182* (2013.01); *G05B 2219/36582* (2013.01)

(58) Field of Classification Search
CPC ...... G05B 19/4083; G05B 2219/36582; G06Q 10/0633; G08B 5/36; G08B 21/182
See application file for complete search history.

(56) References Cited

U.S. PATENT DOCUMENTS

| | | | |
|---|---|---|---|
| 8,370,786 | B1 | 2/2013 | Burstein |
| 8,417,555 | B2 | 4/2013 | Bagheri et al. |
| 8,781,882 | B1 | 7/2014 | Arboletti et al. |
| 8,903,901 | B2 | 12/2014 | Archibold |
| 11,232,383 | B1 | 1/2022 | Burns, Sr. et al. |
| 11,610,670 | B1 | 3/2023 | Chen et al. |

(Continued)

FOREIGN PATENT DOCUMENTS

| | | |
|---|---|---|
| CN | 117522072 A | 2/2024 |
| EP | 3706053 A1 | 9/2020 |
| WO | 2021207116 A1 | 10/2021 |

OTHER PUBLICATIONS

Sisselman et al., "Value-based routing and preference-based routing in customer contact centers," Production and Operations Management 16.3, Feb. 24, 2005, 32 pages.

(Continued)

*Primary Examiner* — Mohammad Ali
*Assistant Examiner* — Sheela Rao
(74) *Attorney, Agent, or Firm* — Fletcher Yoder, P.C.

(57) ABSTRACT

A system includes a controller having a memory configured to store instructions and one or more processors. The controller is configured to receive a constraint time from a first database and a plurality of production times from a second database. The controller identifies one or more outlier production times of the plurality of production times that fall below a lower constraint time limit or exceed an upper constraint time limit. The controller removes the one or more outlier production times from the plurality of production times, determines a mean production time based on the plurality of production times, and generates a notification in response to the mean production time exceeding an upper threshold time or falling below a lower threshold time.

14 Claims, 17 Drawing Sheets

(56) References Cited

U.S. PATENT DOCUMENTS

| | | |
|---|---|---|
| 2005/0004828 A1 | 1/2005 | deSilva et al. |
| 2005/0021383 A1 | 1/2005 | Fliess et al. |
| 2008/0300705 A1 | 12/2008 | Bagchi et al. |
| 2009/0216576 A1 | 8/2009 | Saeed et al. |
| 2010/0088141 A1 | 4/2010 | Hill |
| 2014/0031965 A1 | 1/2014 | Sun et al. |
| 2014/0136260 A1 | 5/2014 | Dasgupta et al. |
| 2015/0046212 A1* | 2/2015 | Mos .................. G06Q 10/0633 |
| | | 705/7.27 |
| 2015/0067688 A1* | 3/2015 | Nagasawa ............ G06F 9/4881 |
| | | 718/102 |
| 2015/0170294 A1 | 6/2015 | Goyal |
| 2017/0185942 A1 | 6/2017 | Hickson et al. |
| 2017/0235849 A1 | 8/2017 | Jacob |
| 2018/0211199 A1 | 7/2018 | Bury et al. |
| 2020/0119890 A1 | 4/2020 | Yeh |
| 2021/0350310 A1 | 11/2021 | Tashkin |
| 2022/0270021 A1 | 8/2022 | Glocker |
| 2022/0404817 A1 | 12/2022 | George, Sr. |
| 2023/0178228 A1 | 6/2023 | Chen |
| 2023/0252426 A1 | 8/2023 | Fogg |
| 2023/0293120 A1 | 9/2023 | Schuman |
| 2024/0020602 A1 | 1/2024 | Wayne |
| 2024/0296397 A1 | 9/2024 | Vasnani |
| 2025/0103975 A1 | 3/2025 | Sardiga et al. |
| 2025/0124370 A1 | 4/2025 | Lokesh et al. |
| 2025/0285050 A1 | 9/2025 | Chobe et al. |

OTHER PUBLICATIONS

Office Action in U.S. Appl. No. 18/373,146 mailed Jul. 2, 2025, 28 pages.

* cited by examiner

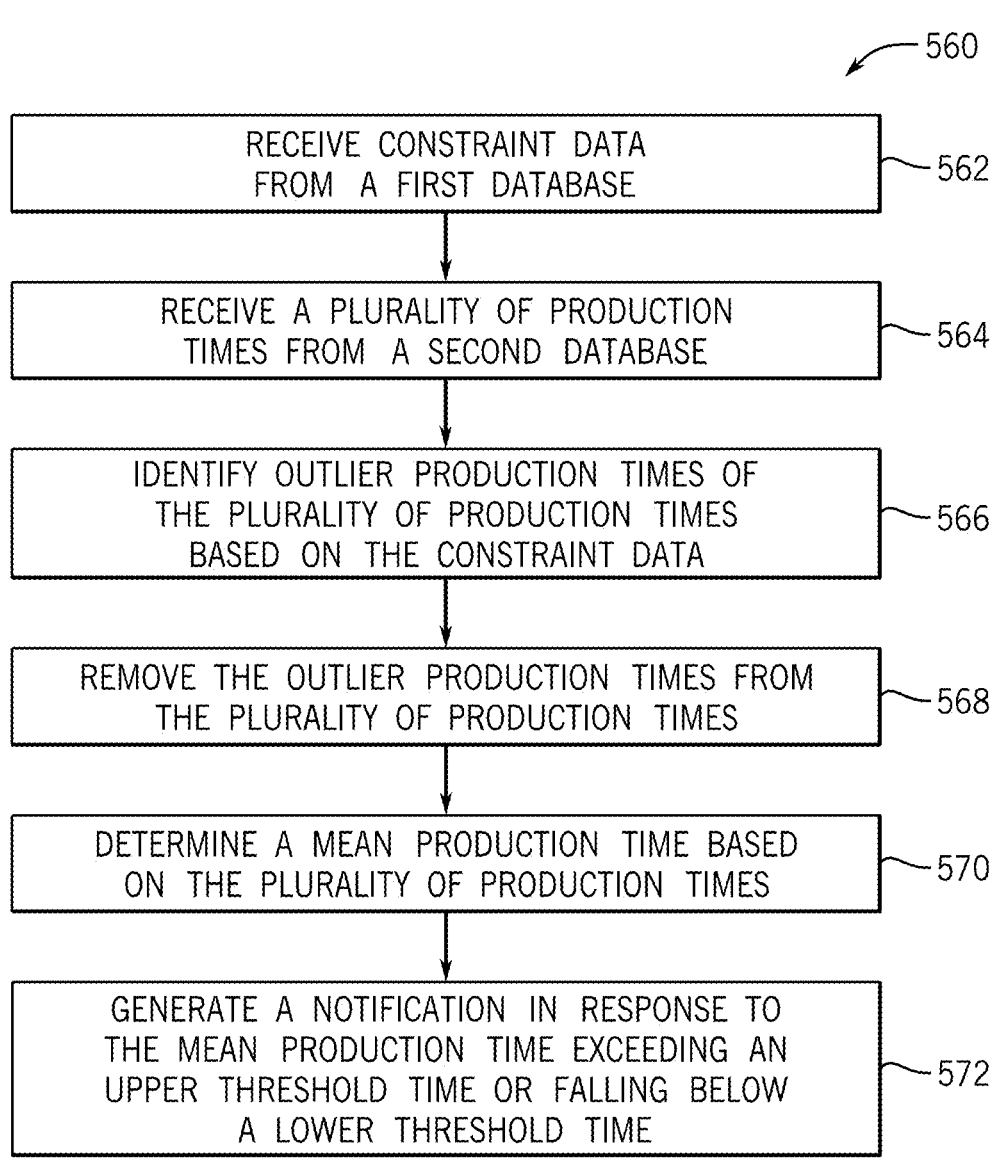

560

RECEIVE  CONSTRAINT  DATA
FROM  A  FIRST  DATABASE

562

RECEIVE  A  PLURALITY  OF  PRODUCTION
TIMES  FROM  A  SECOND  DATABASE

564

IDENTIFY  OUTLIER  PRODUCTION  TIMES  OF
THE  PLURALITY  OF  PRODUCTION  TIMES
BASED  ON  THE  CONSTRAINT  DATA

566

REMOVE  THE  OUTLIER  PRODUCTION  TIMES  FROM
THE  PLURALITY  OF  PRODUCTION  TIMES

568

DETERMINE  A  MEAN  PRODUCTION  TIME  BASED
ON  THE  PLURALITY  OF  PRODUCTION  TIMES

570

GENERATE  A  NOTIFICATION  IN  RESPONSE  TO
THE  MEAN  PRODUCTION  TIME  EXCEEDING  AN
UPPER  THRESHOLD  TIME  OR  FALLING  BELOW
A  LOWER  THRESHOLD  TIME

682 — RECEIVE THE PRIORITIZED SCHEDULE FROM THE SCHEDULING APPLICATION

684 — RECEIVE PERFORMANCE DATA FROM A DATABASE

686 — CONTROL A USER INTERFACE TO DISPLAY THE PERFORMANCE DATA CORRESPONDING TO THE PRIORITIZED SCHEDULE

STAFFING — PLANT: TWINSBURG (1020)

DATE: 2022-05-04   SHIFT: 748 SHIFTA

WORK CENTER: SELECT...   CERTIFICATES: SELECT...

☐ INCLUDE TEAM LEADERS   ☐ INCLUDE TECHNICANS

◉ REASSIGN   ⊗ UNASSIGN   RESERVE FACTOR [%] 0

☐ CERTIFIED MAs ONLY   ☐ UNASSIGNED MAs ONLY

○ RECOMMENDED ASSIGNMENT

| EMPLOYEE AVAILABILITY | ASSIGNED EMPLOYEES | ASSIGNED |
|---|---|---|
| 26 | 26 | 14 / 31 |

| DATE | SHIFT | LINE | EMPLOYEE | WORKCENTER |
|---|---|---|---|---|
| 5 / 4 / 2022 | SHIFTA | VIEW E LINE | | TWB_FINAL_VEX_ASSY_TEST |
| 5 / 4 / 2022 | SHIFTA | VIEW E LINE | | TWB_FINAL_HEAT_CELL_LABOR |
| 5 / 4 / 2022 | SHIFTA | LEGACY L INE | BECK MARK | TWB_FINAL_PLF_ASSY |
| 5 / 4 / 2022 | SHIFTA | RA ACCESS 1 | COBURN MICHELLE | TWB_FINAL_ACC_ASSY_A1 |
| 5 / 4 / 2022 | SHIFTA | ARMOR LINE 1 | BROPHY LENNETTE | TWB_FINAL_ARM_ASSY1 LINE1 |
| 5 / 4 / 2022 | SHIFTA | CONTROL LOGIX LINE 1 | FARMER JOEL | TWB_FINAL_CTL_ASSY_L1 |
| 5 / 4 / 2022 | SHIFTA | CONTROL LOGIX LINE 1 | REDDISH SUSAN | TWB_FINAL_CTL_PACK_L1 |
| 5 / 4 / 2022 | SHIFTA | CONTROL LOGIX LINE 2 | | TWB_FINAL_CTL_ASSY_L2 |
| 5 / 4 / 2022 | SHIFTA | CONTROL LOGIX LINE 2 | | TWB_FINAL_CTL_FUNC_TEST_L2 |
| 5 / 4 / 2022 | SHIFTA | CONTROL LOGIX LINE 2 | | TWB_FINAL_CTL_PACK_L2 |
| 5 / 4 / 2022 | SHIFTA | CONTROL LOGIX LINE 3 | SQUALLS RICHARD | TWB_FINAL_CTL_ASSY_L3 |
| 5 / 4 / 2022 | SHIFTA | CONTROL LOGIX LINE 3 | PEOPLES JR EARL | TWB_FINAL_CTL_FUNC_TEST_L3 |
| 5 / 4 / 2022 | SHIFTA | CONTROL LOGIX LINE 4 | FRANK LELA | TWB_FINAL_CTL_PACK_L3 |
| 5 / 4 / 2022 | SHIFTA | CONTROL LOGIX LINE 4 | GATTEN MARY | TWB_FINAL_CTL_ASSY_L4 |
| 5 / 4 / 2022 | SHIFTA | CONTROL LOGIX LINE 4 | MARBURY ARCINIA | TWB_FINAL_CTL_FUNC_TEST_L4 |
| 5 / 4 / 2022 | SHIFTA | CONTROL LOGIX LINE 4 | WYANT JENNIFER | TWB_FINAL_CTL_PACK_L4 |

| TWINSBURG SHIFT A | | OPERATING ASSIGNMENTS | 780 → | 11:58:7 |
| --- | --- | --- | --- | --- |
| PRESENT: 28 | | PAGE:1 / 1 | | ABSENT:0 |
| * | OPERATOR → 734 | STATION | OPERATOR | STATION |
| A | AHMADI KHAN AGHA | VEX-ASSY-TEST | * | |
| | ALEMY HASIBULLA | VEX-LOGIC-ASSY | L  LAMBERT FRANK | K5700-ASSY1-LY |
| B | BAKER MAGALY | CTL-PACK-L1 | M MARBURY ARCINIA | CTL-FUNC-TEST-L2 |
| | BAYON MIRTA | CTL-ASSY-L4 | P  PALANCA MA. NENITA | ACC-ASSY-A1 |
| | BECK MARK | RACK-ASSY | PEOPLES JR EARL | CTL-FUNC-TEST-L4 |
| | BREWSTER LOURA | VEX-POSTTEST | POOLE SHALINDA | RACK-ASSY |
| | BROPHY LENNETTE | ARM-ASSY1-LINE1 | S  SQUALLS RICHARD | CLT-ASSY-L1 |
| C | CLOPTON RASHAWN | HEAT-CELL-LABOR | T  TAYLOR RENEE | SFT-PACK |
| | COBURN MICHELLE | ACC-ASSY-A2 | TALOR CORINNE | CLT-ASSY-L2 |
| | COLE VANESSA | VEX-PACK | THOMPSON JESSICA | CTL-FUNC-TEST-L3 |
| | COLEMAN BILLY | CTL-ASSY-L3 | V  VAN BURSKIRK QUIN | CLT-PACK-L4 |
| D | DEAN LEBRON | K5700-ASSY2-L2 | Y  YOUNG CHEYENNE | SFT-AUTO-FINAL-TEST |
| F | FLOWER CAMERON | K5700-PACK-L2 | | |
| | FRANK LELA | CLT-PACK-L2 | | |
| G | GALL PAULINE | SFT-ASSY | | |

FIG. 16

SYSTEMS AND METHODS FOR MANUFACTURING APPLICATIONS

BACKGROUND

The present disclosure relates generally to manufacturing applications. Specifically, the present disclosure relates to a scheduling application, a staffing application, an engineering application, and a dashboards application that can be used together to improve performance of a manufacturing operation.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Manufacturing companies are often concerned with improving the efficiency of their production lines. For example, many manufacturing companies want to maximize the amount of output of their production lines, while also minimizing the amount of time and resources used to produce a single widget. Many large companies have turned to manufacturing execution systems (MES) for aggregating data from one or more databases and allocating work based on constraints, such as constraint times or employee certifications, and for outputting production data gathered from the production line.

In operating a production line using an MES, decisions may be made and actions taken based on incorrect assumptions including production line availability, employee absence, employee certifications, and real-time performance data. Accordingly, it may be desirable to develop techniques for orchestrating the planning, engineering, and operations functions of the manufacturing process via an integration of planning, engineering, and operations systems through a common architecture.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure is directed to a production system for a manufacturing facility. The production system includes data-processing applications (e.g., data-processing suites) that receive data from databases and/or other data-processing applications and generate data to be output to databases, one or more end-users, and/or other data-processing applications. Specifically, the data-processing applications may include a scheduling application, a staffing application, a dashboards application, and an engineering application. The scheduling application may receive data from a manufacturing execution system (MES) and/or an enterprise resource planning (ERP) application and use the received data to produce a recommended finite capacity prioritized schedule that maximizes output and customer schedule attainment given complex product mixes, time constraints, tooling recommendations, and production lines shift definitions. The scheduling application may send the staffing recommendation and the recommended finite capacity prioritized schedule to the staffing application and may additionally send the recommended finite capacity prioritized schedule to the dashboards application and/or the MES. In addition to receiving the staffing recommendation and the recommended finite capacity prioritized schedule from the scheduling application, the staffing application may receive data (e.g., staffing data) from one or more databases. The engineering application may receive data directly from the MES and may receive data indirectly from the scheduling application. The engineering application may compare constraint times with performance data to provide engineers with an interface for monitoring whether the performance data meets the constraint times. The dashboards application may receive the recommended finite capacity prioritized schedule from the scheduling application and the performance data from the MES. The dashboards application may display the performance data (e.g., on the shop floor) for multiple time shifts of each employee, such that employees and/or employers may be able to visually analyze the performance of one or more production lines over a span of multiple time shifts. Accordingly, although the scheduling application, the staffing application, the dashboards application, and/or the engineering application may be designed to function as stand-alone applications, these applications may also interact with each other to enable the production system to respond more quickly to unforeseen changes and/or improve efficiency in the production workflow.

In an embodiment, a system includes a controller having a memory configured to store instructions and one or more processors. The controller is configured to receive a constraint time from a first database. The constraint time includes a time constraint for completing a work order. The controller is also configured to receive a plurality of production times from a second database. The plurality of production times includes a plurality of measured times for completing the work order. The controller is also configured to identify one or more outlier production times of the plurality of production times based on the constraint time. The one or more outlier production times include one or more production times that fall below a lower constraint time limit or exceed an upper constraint time limit. The controller is also configured to remove the one or more outlier production times from the plurality of production times. The controller is also configured to determine a mean production time based on the plurality of production times. The controller is also configured to generate a notification in response to the mean production time exceeding an upper threshold time or falling below a lower threshold time. The notification includes a visual alert indicative that the mean production time exceeds the upper threshold time or falls below the lower threshold time.

In another embodiment, a method includes receiving, via a processor, a constraint time from a first database. The constraint time includes a time constraint for completing a work order. The method also includes receiving, via the processor, a plurality of production times from a second database. The plurality of production times includes a plurality of measured times for completing the work order. The method also includes identifying, via the processor, one or more outlier production times of the plurality of production times based on the constraint time. The one or more outlier production times include one or more production times that fall below a lower constraint time limit or exceed an upper constraint time limit. The method also includes removing, via the processor, the one or more outlier production times from the plurality of production times. The method also includes determining, via the processor, a mean production time based on the plurality of production times. The method also includes generating, via the processor, a notification in response to the mean production time exceeding an upper threshold time or falling below a lower threshold time. The notification includes a visual alert indicative that the mean production time exceeds the upper threshold time or falls below the lower threshold time.

In another embodiment, a non-transitory computer-readable storage medium, comprising processor-executable routines that, when executed by a processor, cause the processor to perform operations including receiving a constraint time from a first database. The constraint time includes a time constraint for completing a work order. The operations performed by the processor also include receiving a plurality of production times from a second database. The plurality of production times includes a plurality of measured times for completing the work order. The operations performed by the processor also include identifying one or more outlier production times of the plurality of production times based on the constraint time. The one or more outlier production times include one or more production times that fall below a lower constraint time limit or exceed an upper constraint time limit. The operations performed by the processor also include removing the one or more outlier production times from the plurality of production times. The operations performed by the processor also include determining a mean production time based on the plurality of production times. The operations performed by the processor also include generating a notification in response to the mean production time exceeding an upper threshold time or falling below a lower threshold time. The notification includes a visual alert indicative that the mean production time exceeds the upper threshold time or falls below the lower threshold time.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 10 is a flowchart illustrating a process performed by the engineering application of FIG. 4, in accordance with aspects of the present disclosure;

FIG. 15 is a schematic illustrating a display having a staffing plan generated by the staffing application of FIG. 4, in accordance with aspects of the present disclosure;

FIG. 16 is a schematic illustrating a display having an end-user assignment generated by the staffing application of FIG. 4, in accordance with aspects of the present disclosure.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

Figure 1:
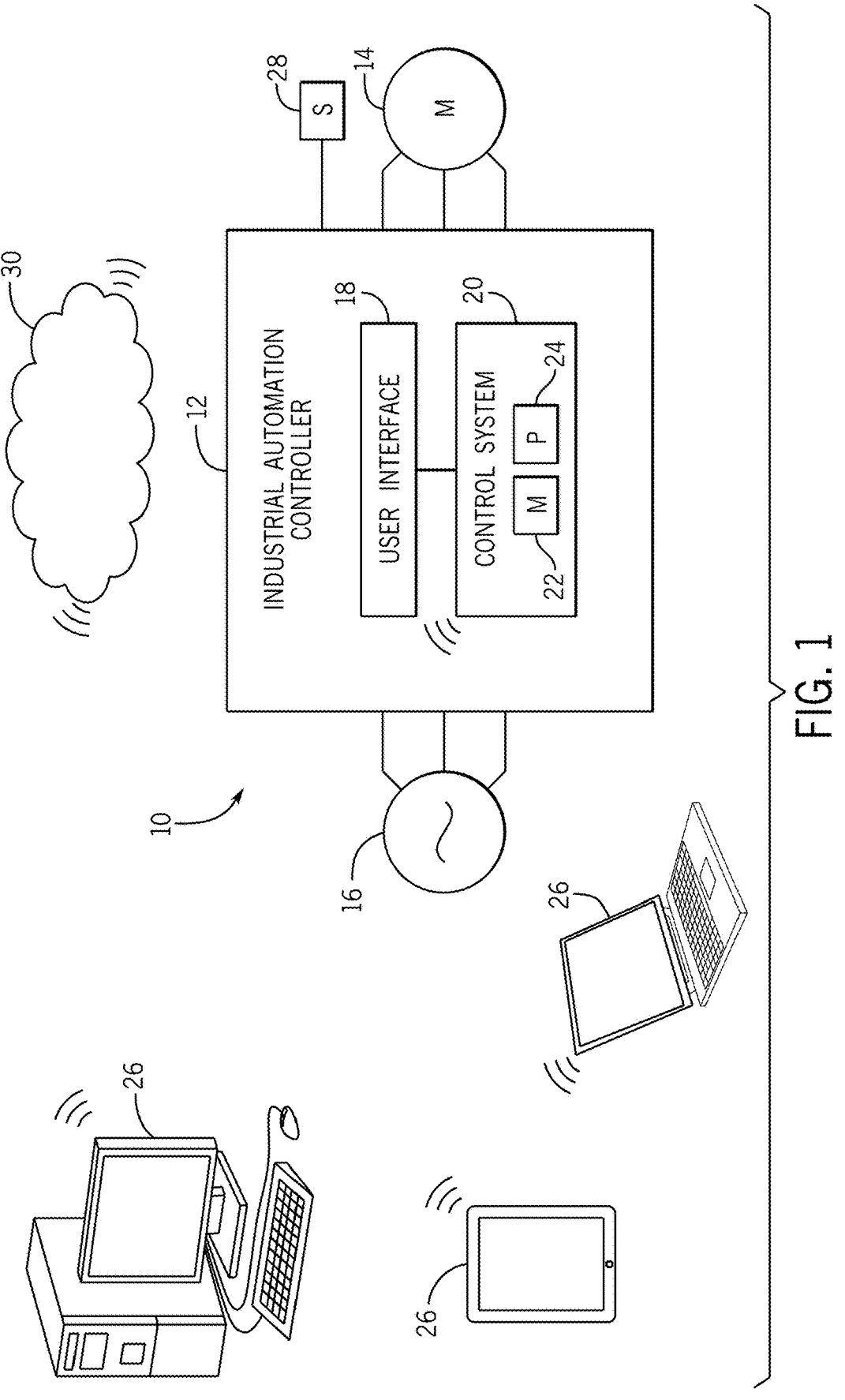
FIG. 1 is a schematic view of an operation technology (OT) environment, in accordance with an embodiment.

By way of introduction, FIG. 1 is a schematic view of an example OT environment 10 in which the embodiments described herein may be implemented. As shown, the OT environment 10 is an industrial automation system that includes a controller 12 and an actuator 14 (e.g., a motor). The OT environment 10 may also include, or be coupled to, a power source 16. The power source 16 may include a generator, an external power grid, a battery, or some other source of power. The controller 12 may be a stand-alone control unit that controls multiple industrial automation components (e.g., a plurality of motors 14), a controller 12 that controls the operation of a single automation component (e.g., motor 14), or a subcomponent within a larger OT environment 10. In the instant embodiment, the controller 12 includes a user interface 18, such as a human machine interface (HMI), and a control system 20, which may include a memory 22 and a processor 24. The controller 12 may include a cabinet or some other enclosure for housing various components of the OT environment 10, such as a motor starter, a disconnect switch, etc.

The control system 20 may be programmed (e.g., via computer readable code or instructions stored on the memory 22, such as a non-transitory computer readable medium, and executable by the processor 24) to provide signals for controlling the motor 14. In certain embodiments, the control system 20 may be programmed according to a specific configuration desired for a particular application. For example, the control system 20 may be programmed to respond to external inputs, such as reference signals, alarms, command/status signals, etc. The external inputs may originate from one or more relays or other electronic devices. The programming of the control system 20 may be accomplished through software or firmware code that may be loaded onto the internal memory 22 of the control system 20 (e.g., via a locally or remotely located computing device 26) or programmed via the user interface 18 of the controller 12. The control system 20 may respond to a set of operating parameters. The settings of the various operating parameters may determine the operating characteristics of the controller 12. For example, various operating parameters may determine the speed or torque of the motor 14 or may determine how the controller 12 responds to the various external inputs. As such, the operating parameters may be used to map control variables within the controller 12 or to control other devices communicatively coupled to the controller 12. These variables may include, for example, speed presets, feedback types and values, computational gains and variables, algorithm adjustments, status and feedback variables, programmable logic controller (PLC) control programming, and the like.

In some embodiments, the controller 12 may be communicatively coupled to one or more sensors 28 for detecting operating temperatures, voltages, currents, pressures, flow rates, and other measurable variables associated with the OT environment 10. With feedback data from the sensors 28, the control system 20 may keep detailed track of the various conditions under which the OT environment 10 may be operating. For example, the feedback data may include conditions such as actual motor speed, voltage, frequency, power quality, alarm conditions, etc. In some embodiments, the feedback data may be communicated back to the computing device 26 for additional analysis.

The computing device 26 may be communicatively coupled to the controller 12 via a wired or wireless connection. The computing device 26 may receive inputs from a user defining an industrial automation project using a native application running on the computing device 26 or using a website accessible via a browser application, a software application, or the like. The user may define the industrial automation project by writing code, interacting with a visual programming interface, inputting or selecting values via a graphical user interface, or providing some other inputs. The user may use licensed software and/or subscription services to create, analyze, and otherwise develop the project. The computing device 26 may send a project to the controller 12 for execution. Execution of the industrial automation project causes the controller 12 to control components (e.g., motor 14) within the OT environment 10 through performance of one or more tasks and/or processes. In some applications, the controller 12 may be communicatively positioned in a private network and/or behind a firewall, such that the controller 12 does not have communication access outside a local network and is not in communication with any devices outside the firewall, other than the computing device 26. The controller 12 may collect feedback data during execution of the project, and the feedback data may be provided back to the computing device 26 for analysis. Feedback data may include, for example, one or more execution times, one or more alerts, one or more error messages, one or more alarm conditions, one or more temperatures, one or more pressures, one or more flow rates, one or more motor speeds, one or more voltages, one or more frequencies, and so forth. The project may be updated via the computing device 26 based on the analysis of the feedback data.

The computing device 26 may be communicatively coupled to a cloud server 30 or remote server via the internet, or some other network. In one embodiment, the cloud server 30 may be operated by the manufacturer of the controller 12, a software provider, a seller of the controller 12, a service provider, operator of the controller 12, owner of the controller 12, etc. The cloud server 30 may be used to help customers create and/or modify projects, to help troubleshoot any problems that may arise with the controller 12, develop policies, or to provide other services (e.g., project analysis, enabling, restricting capabilities of the controller 12, data analysis, controller firmware updates, etc.). The remote/cloud server 30 may be one or more servers operated by the manufacturer, software provider, seller, service provider, operator, or owner of the controller 12. The remote/cloud server 30 may be disposed at a facility owned and/or operated by the manufacturer, software provider, seller, service provider, operator, or owner of the controller 12. In other embodiments, the remote/cloud server 30 may be disposed in a datacenter in which the manufacturer, software provider, seller, service provider, operator, or owner of the controller 12 owns or rents server space. In further embodiments, the remote/cloud server 30 may include multiple servers operating in one or more data center to provide a cloud computing environment.

Figure 2:
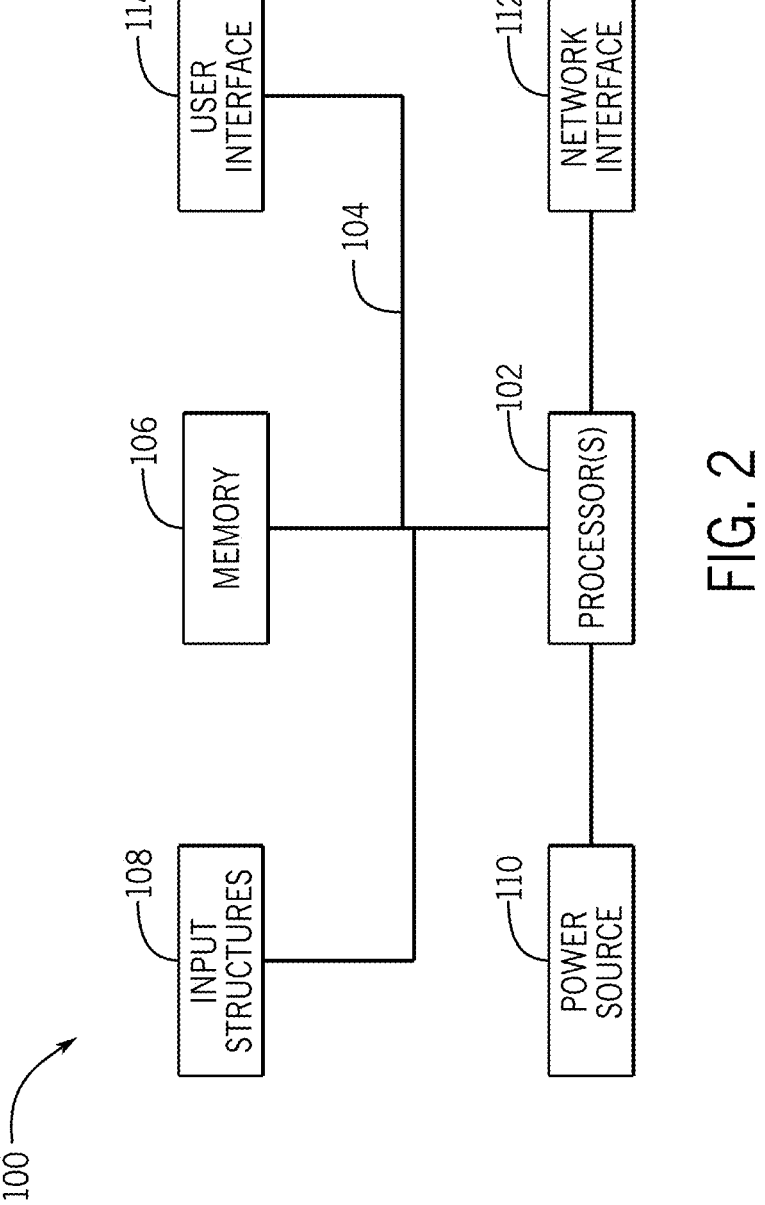
FIG. 2 is a block diagram of example components that could be used in the industrial automation system of FIG. 1, in accordance with an embodiment.

FIG. 2 illustrates a block diagram of example components of a computing device 100 that could be used as the computing device 26, the cloud/remote server 30, the controller 12, or some other device provided by the present disclosure. As used herein, the computing device 100 may be implemented as one or more computing systems including laptop, notebook, desktop, tablet, HMI, or workstation computers, as well as server type devices or portable, communication type devices, such as cellular telephones and/or other suitable computing devices.

As illustrated, the computing device 100 may include various hardware components, such as one or more processors 102, one or more busses 104, memory 106, input structures 108, a power source 110, a network interface 112, a user interface 114, and/or other computer components useful in performing the functions described herein.

The one or more processors 102 may include, in certain implementations, microprocessors configured to execute instructions stored in the memory 106 or other accessible locations. Alternatively, the one or more processors 102 may be implemented as application-specific integrated circuits (ASICs), field-programmable gate arrays (FPGAs), and/or other devices designed to perform functions discussed herein in a dedicated manner. As will be appreciated, multiple processors 102 or processing components may be used to perform functions discussed herein in a distributed or parallel manner.

The memory 106 may encompass any tangible, non-transitory medium for storing data or executable routines. Although shown for convenience as a single block in FIG. 2, the memory 106 may encompass various discrete media in the same or different physical locations. The one or more processors 102 may access data in the memory 106 via one or more busses 104.

The input structures 108 may allow a user to input data and/or commands to the device 100 and may include mice, touchpads, touchscreens, keyboards, controllers, and so forth. The power source 110 can be any suitable source for providing power to the various components of the computing device 100, including line and battery power. In the depicted example, the device 100 includes a network interface 112. Such a network interface 112 may allow communication with other devices on a network using one or more communication protocols. In the depicted example, the device 100 includes a user interface 114, such as a display that may display images or data provided by the one or more processors 102. The user interface 114 may include, for example, a monitor, a display, and so forth. As will be appreciated, in a real-world context a processor-based system, such as the computing device 100 of FIG. 2, may be employed to implement some or all of the present approach, such as performing the functions of the controller, the computing device 26, and/or the cloud/remote server 30 shown in FIG. 1, as well as other memory-containing devices.

Figure 3:
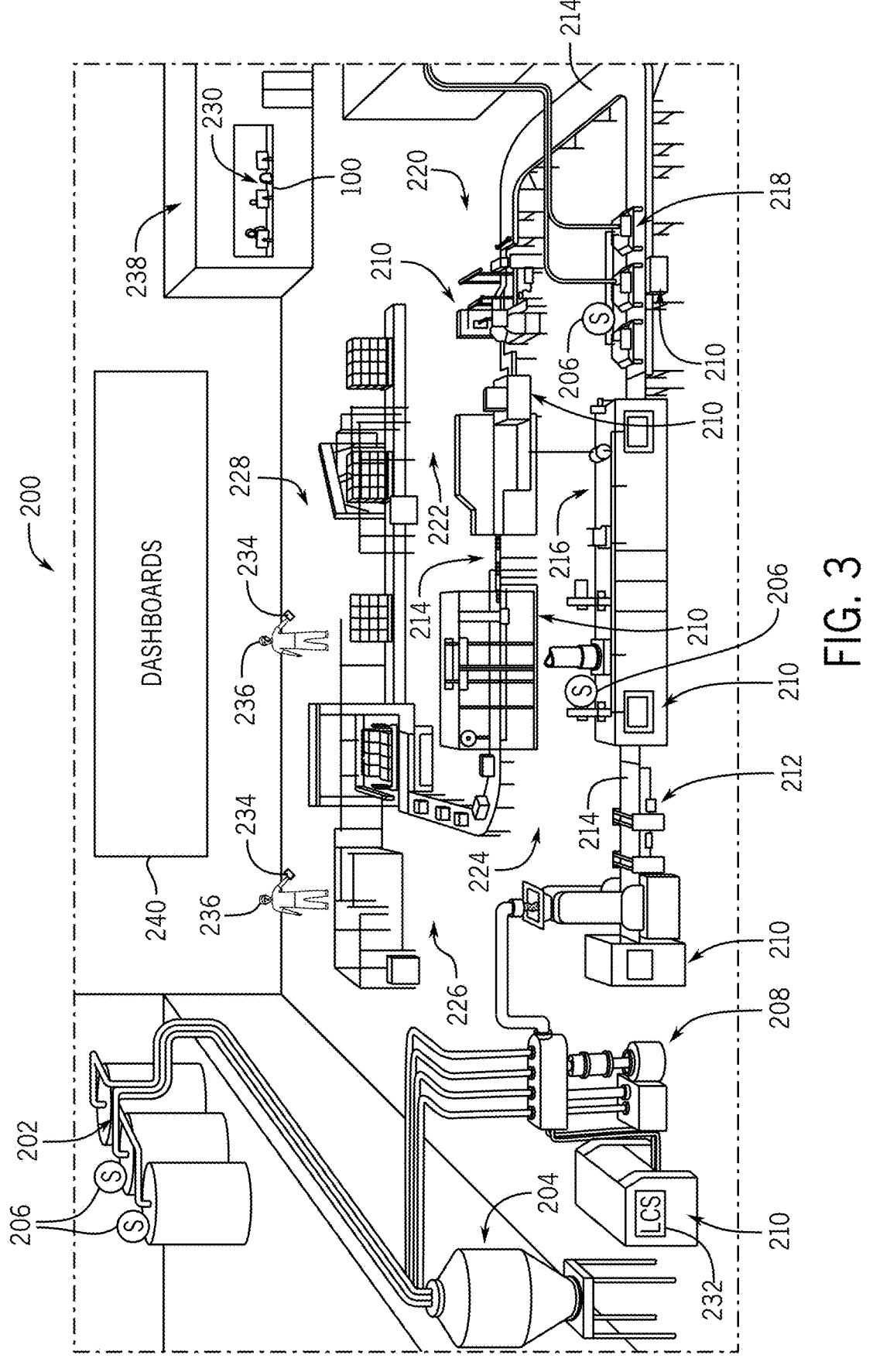
FIG. 3 is a perspective view of an industrial automation system as an example of the OT environment of FIG. 1, in accordance with an embodiment.

FIG. 3 is a perspective view of an example industrial automation system 200 employed by a food manufacturer. It should be noted that although the example industrial automation system 200 of FIG. 3 is directed at a food manufacturer, the present embodiments described herein may be employed within any suitable industry, such as automotive, cosmetics, chemical manufacturing/processing, mining, hydrocarbon production, manufacturing, and the like. The following brief description of the example industrial automation system 200 employed by the food manufacturer is provided herein to help facilitate a more comprehensive understanding of the OT environment to which the techniques described herein may be applied. As such, the embodiments described herein should not be limited to be applied to the example depicted in FIG. 3.

Referring now to FIG. 3, the example industrial automation system 200 for a food manufacturer may include any number of machines, such as silos 202 and tanks 204. The silos 202 and the tanks 204 may store different types of raw material, such as grains, salt, yeast, sweeteners, flavoring agents, coloring agents, vitamins, minerals, and preservatives. In some embodiments, sensors 206 may be positioned within or around the silos 202, the tanks 204, or other suitable locations within the industrial automation system 200 to measure certain properties, such as temperature, mass, volume, pressure humidity, and the like.

The raw materials may be provided to a mixer 208, which may mix the raw materials together according to a specified ratio. The mixer 208 and other machines in the industrial automation system 200 may employ certain industrial automation devices 210 to control the operations of the mixer 208 and other machines. The industrial automation devices 210 may include controllers (e.g., industrial automation controller 12), input/output (I/O) modules, motor control centers (e.g., control system 20), motors (e.g., actuator 14), human-machine interfaces (e.g., user interface 18), operator interfaces, contactors, starters, sensors (e.g., sensor 28, sensors 206), conveyors, drives, relays, protection devices, switchgear, compressors, firewall, network switches (e.g., Ethernet switches, modular-managed, fixed-managed, service-router, industrial, unmanaged, etc.) and the like.

The mixer 208 may provide a mixed compound to a depositor 212, which may deposit a certain amount of the mixed compound onto conveyor 214. The depositor 212 may deposit the mixed compound on the conveyor 214 according to a shape and amount that may be specified to a control system for the depositor 212. The conveyor 214 may be any suitable conveyor system that transports items to various types of machinery across the industrial automation system 200. For example, the conveyor 214 may transport deposited material from the depositor 212 to an oven 216, which may bake the deposited material. The baked material may be transported to a cooling tunnel 218 to cool the baked material, such that the cooled material may be transported to a tray loader 220 via the conveyor 214. The tray loader 220 may include machinery that receives a certain amount of the cooled material for packaging. By way of example, the tray loader 220 may receive 25 ounces of the cooled material, which may correspond to an amount of cereal provided in a cereal box.

A tray wrapper 222 may receive a collected amount of cooled material from the tray loader 220 into a bag, which may be sealed. The tray wrapper 222 may receive the collected amount of cooled material in a bag and seal the bag using appropriate machinery. The conveyor 214 may transport the bagged material to case packer 224, which may package the bagged material into a box. The boxes may be transported to a palletizer 226, which may stack a certain number of boxes on a pallet that may be lifted using a forklift or the like. The stacked boxes may then be transported to a shrink wrapper 228, which may wrap the stacked boxes with shrink-wrap to keep the stacked boxes together while on the pallet. The shrink-wrapped boxes may then be transported to storage or the like via a forklift or other suitable transport vehicle.

To perform the operations of each of the devices in the example industrial automation system 200, the industrial automation devices 210 may be used to provide power to the machinery used to perform certain tasks, provide protection to the machinery from electrical surges, prevent injuries from occurring with human operators in the industrial automation system 200, monitor the operations of the respective device, communicate data regarding the respective device to a supervisory control system 230, and the like. In some embodiments, each industrial automation device 210 or a group of industrial automation devices 20 may be controlled using a local control system 232. The local control system 232 may include receive data regarding the operation of the respective industrial automation device 210, other industrial automation devices 210, user inputs, and other suitable inputs to control the operations of the respective industrial automation devices 210.

An operator device 234 is an example of the computing device 26 that enables an operator 236 to access or interface with other industrial automation devices 210 and/or computing devices. For example, the operator device 234 may include the processor 102, busses 104, memory 106, input structures 108, power source 110, network interface 112, and user interface 114.

Collectively, any or all of the machines (e.g., mixer 208, palletizer 226), the industrial automation devices 210, the computing devices 26, the cloud server 30, the supervisory control system 230, and any other elements of FIG. 3 may constitute the OT environment. These elements may communicate across the OT environment via a network (e.g., a local area network (LAN)). In some embodiments, the network may be managed from a network operations center 238 (NOC). The NOC 238 is a centralized location from which a network administrator may monitor and manage the network. For example, the NOC 238 may include a central computing system which executes a network security system, monitors traffic into and out of the network, maintains databases, and manages security policies. As shown, the NOC 238 is local to the industrial automation system 200, but in other embodiments, the NOC 238 may be located at a remote location.

In the illustrated embodiment, a dashboard 240 may be located in the OT environment in view of the operators 236. As discussed herein, the dashboard 240 may display information pertaining to assigned work stations of the operators 236. Additionally, the dashboard 240 may convey information related to progress of a portion of the industrial automation system 200 (e.g., a product line) and/or an effectiveness (e.g., efficiency) of a portion of the industrial automation system 200.

In regards to FIGS. 1-3, the present disclosure is specifically directed towards eliminating delays due to communication lag between different roles related to the OT environment. One problem that may occur in OT environments is the lack of synchronization between the performance and abilities of operators working on the production lines and the process used for assigning work orders to the operators. For example, there may be situations in which a particular operator desires to work on a particular production line, even though overall company efficiency may be improved if the particular operator were to work on another production line. Additionally, managers may assign too few or too many staff members to a particular production line without knowledge of the real-time production capacity of the production line. Accordingly, the present disclosure seeks to address the lack of coordination between the production capacity of the production lines, available staffing resources, and the prioritization of manufacturing work orders. Specifically, the present disclosure is directed towards a closed loop (e.g., having feedback) system for a manufacturing environment having a scheduling application, a staffing application, an engineering application, and/or a dashboards application.

Figure 4:
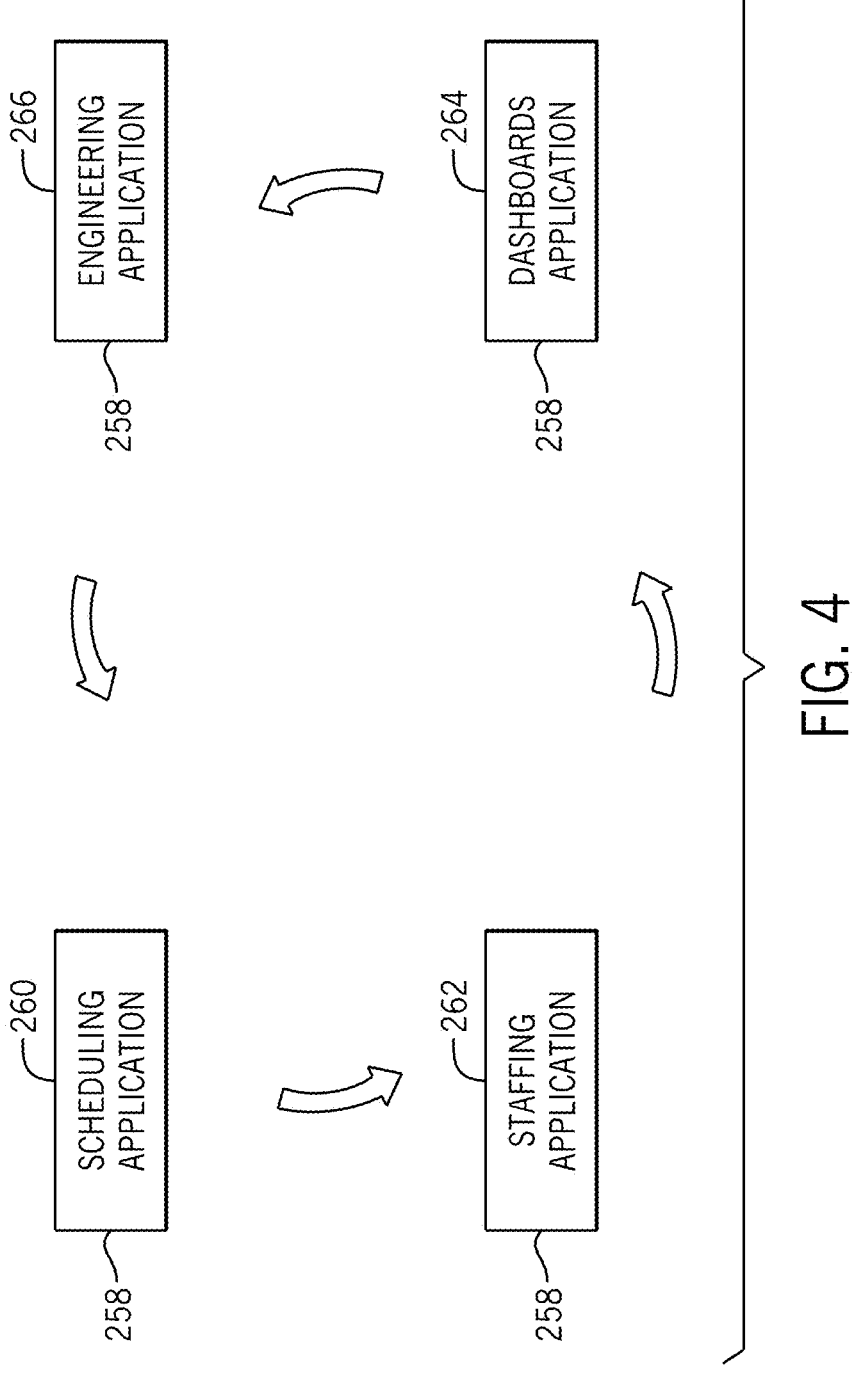
FIG. 4 is a schematic diagram illustrating an embodiment of a scheduling application, a staffing application, a dashboards application, and an engineering application, in accordance with aspects of the present disclosure.

Referring now to FIG. 4, the controller and/or any computing device in the OT environment, or otherwise in communication with one or more components of the OT environment, may include computer readable code or instructions including one or more applications 258 which may be executable by the processor. As shown, the one or more applications 258 may include a scheduling application 260, a staffing application 262, a dashboards application 264, and/or an engineering application 266. The arrows 268 disposed between the applications 258 indicate that these applications may directly or indirectly interact with each other. For example, the applications 258 may output one or more datasets that are subsequently used by one or more other applications 258. In some embodiments, the applications 258 may communicate with one another via APIs, or some other way. Additionally, the applications 258 may output information which may be used (e.g., automatically or manually by the operator 236) to adjust one or more parameters of one or more other applications 258.

It should be recognized that while the illustrated embodiment shows the scheduling application 260, the staffing application 262, the dashboards application 264, and the engineering application 266, a single computing device or controller may run one or more of these applications 258. For example, a computing device may include the scheduling application 260 and the staffing application 262, whereas the dashboards application 264 and the engineering application 266 may operate on a different computing device that communicates directly or indirectly with the computing device. The interaction between the applications 258 is discussed in more detail herein.

Figure 5:
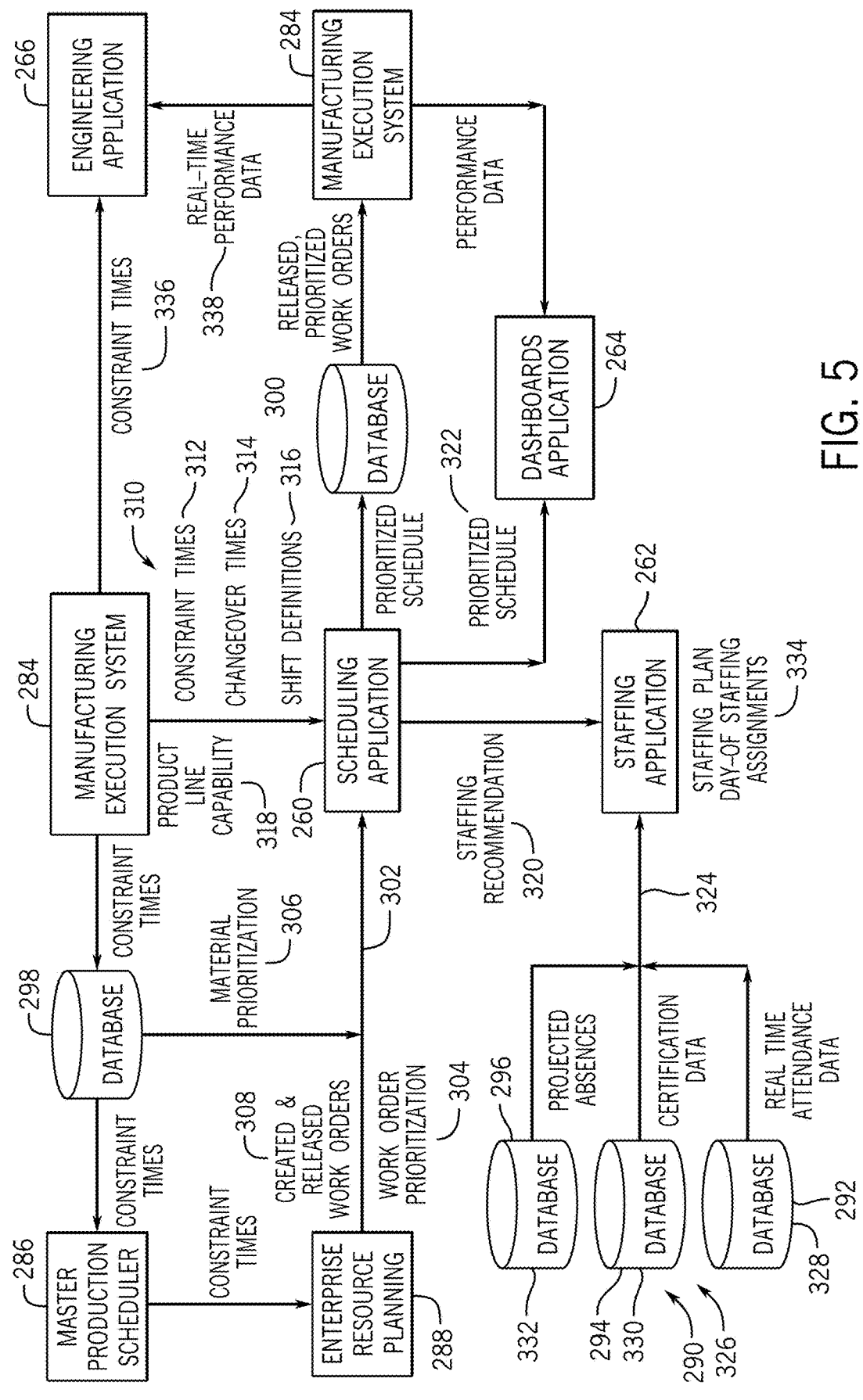
FIG. 5 is a schematic view of a production system employing the scheduling application, the staffing application, the dashboards application, and the engineering application of FIG. 4, in accordance with aspects of the present disclosure.

Referring now to FIG. 5, the OT environment may include one or more components (e.g., controllers, computing devices, etc.) running the one or more of the applications 258, an MES 284 (e.g., manufacturing application), a master production scheduler 286, an ERP 288 (e.g., enterprise application), and a plurality of databases 290 (e.g., first database 292, second database 294, third database 296, fourth database 298, and fifth database 300). As shown, the scheduling application 260 may be communicatively coupled with the MES 284, the ERP 288, the staffing application 262, the dashboards application 264, and the fifth database 300. The scheduling application 260 may receive production data 302 (e.g., second set of data) from the ERP 288, which may receive data from the master production scheduler 286, and/or a database 290. The production data 302 may include one or more parameters that relate to prioritization of work orders and materials. For example, the production data 302 may include a work order priority 304, a material priority 306, and/or created and released work orders 308. The work order priority 304 may include a priority level/index associated with the completion of a particular work order. For example, the work order priority 304 may include a low work order priority, a medium work order priority, and/or a high work order priority. The material priority 306 may include a priority level/index associated with a level of use of one or more materials. For example, the material priority 306 may include a low material priority, a medium material priority, and/or a high material priority. The created and released work orders 308 may include work orders that have been created for a particular widget (e.g., part, product, etc.), and released to the production lines for completion. As shown, the work order priority 304 and the material priority 306 may be transmitted from the fourth database 298 to the scheduling application 260. Additionally, the created and released work orders 308 are transmitted from the ERP 288 to the scheduling application 260.

As shown, the scheduling application 260 may also receive constraint data 310 from the MES 284 and/or a database 290. The constraint data 310 may include constraint times 312, changeover times 314, shift times 316, and/or a product line capability 318. The constraint time 312 may include the time for completing a longest step in a process for a single unit. The changeover time 314 may include an amount of time between separate work orders. The product line capability 318 may include a number of parts that may be produced by a production line in a certain amount of time and/or the type of part that a production line may produce.

The scheduling application 260 may generate a staffing recommendation 320 based on the production data 302 and the constraint data 310. Additionally or alternatively, the scheduling application 260 may generate a prioritized schedule 322 based on the production data 302 and the constraint data 310. The staffing recommendation 320 may include a certain number of staff and/or a certain amount of expertise recommended for a particular shift, given the production data 302 and the constraint data 310. For example, the staffing recommendation 320 may include a labor index, an expertise index, or a combination thereof. The prioritized schedule 322 may include a schedule of work orders that need to be completed. For example, the prioritized schedule 322 may include a table (e.g., schedule, list, organization, etc.) of work orders for each product line of the industrial automation system 200. The work orders may be organized in the prioritized schedule 322 based on a level of priority of completion. For example, work orders that are to be completed sooner may be placed near the top of the prioritized schedule 322.

The scheduling application 260 may transmit the staffing recommendation 320 and the prioritized schedule 322 to the staffing application 262. Additionally, the scheduling application 260 may transmit the prioritized schedule 322 to the dashboards application 264 and/or the fifth database 300. The fifth database 300 may transmit prioritized work orders to the MES 284 based on the prioritized schedule 322.

As shown, the staffing application 262 may receive the staffing recommendation 320 and the prioritized schedule 322 from the scheduling application 260. Additionally, the staffing application may receive employee data 324 from one or more employee databases 326 (e.g., first database 292, second database 294, and third database 296). The employee databases 326 may include data related to the operators 236 of the industrial automation system 200. The employee databases 326 may include a real-time attendance database 328 (e.g., first database 292) that tracks the real-time attendance of the operators 236. For example, the real-time attendance database 328 may store data collected from a shift check-in system (e.g., timeclock system). The employee databases 326 may also include a certification database 330 (e.g., second database 294) that includes certifications earned by the operators 236. For example, a particular operator 236 may be certified to operate a certain piece of equipment and may not be certified for another piece of equipment, making the particular operator 236 qualified to work on a subset of the production lines. The employee databases 326 may also include a projected absences database 332 that includes projected absences of the operators 236 based on one or more factors. For example, the projected absences database 332 may consider prior absences, vacation time, and the like.

The staffing application 262 may generate a staffing plan 334 based on the staffing recommendation 320, the prioritized schedule 322, and the employee data 324. The staffing plan 334 may include day-of (e.g., by day, by shift) staffing assignments for the operators. For example, the staffing plan 334 may communicate which product line or station each operator is to work for a particular shift. In some embodiments, the staffing application 262 may transmit the staffing plan 334 to the dashboards application 264 to be displayed on one or more dashboards disposed throughout the OT environment.

As shown, the engineering application 266 may receive second constraint data 336 from the MES 284. The second constraint data 336 may include the constraint times 312 for completing a particular work order. Additionally, the engineering application 266 may receive real-time performance data 338 from the MES 284. The real-time performance data 338 may include one or more indicators of a current performance of the industrial automation system 200. For example, the real-time performance data 338 may include the duration of time that was used by the operators 236 to complete a particular work order. As discussed in further detail herein, the engineering application 266 may generate a notification based on the second constraint data 336 and the real-time performance data 338. For example, the engineering application 266 may generate a notification in response to the real-time performance data 338 exceeding a threshold set by the constraint times 312 of the second constraint data 336.

As shown, the dashboards application 264 may receive the prioritized schedule 322 from the scheduling application 260 and the real-time performance data 338 from the MES 284. The dashboards application 264 may display the real-time performance data 338 of the prioritized schedule 322 on dashboards (e.g., monitors) displayed throughout the OT environment. For example, the dashboards application 264 may control dashboards to display the performance related to a particular work order, a particular production line, a particular shift, or a combination thereof.

Figure 6:
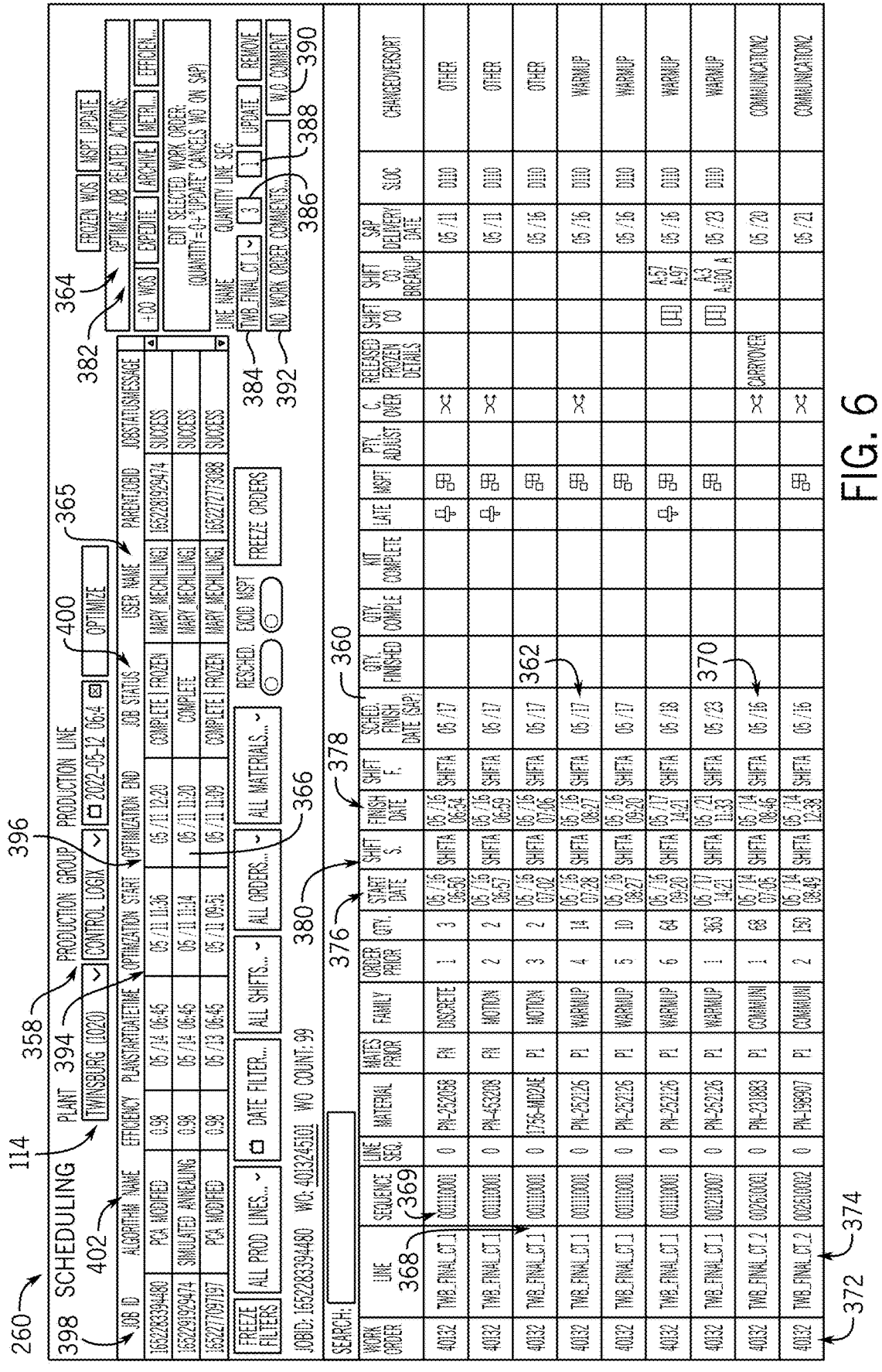
FIG. 6 is a schematic illustrating a display having a prioritized schedule output by the scheduling application of FIG. 4, in accordance with aspects of the present disclosure.

Referring now to FIG. 6, the scheduling application 260 may cause the user interface 114 to display a screen 358 having a schedule table 360 having the prioritized schedule 362, an editing interface 364 for enabling the operator to manually edit the prioritized schedule 362, and an executions table 365 having one or more executions 366 of an iterative algorithm used by the scheduling application 260 to generate the prioritized schedule 362. The iterative algorithm is discussed in more detail herein.

The schedule table 360 may display a plurality of work orders 368. Each row 370 of the schedule table 360 may include data for a particular work order 368. For example, each row 370 may include a unique identifier 372, a production line identifier 374, a start date 376 of the work order 368, a finish date 378 of the work order 368, a line sequence 369, and/or a shift identifier 380. It should be recognized that the schedule table 360 may include additional information related to the work orders 368.

The editing interface 364 may provide one or more options 382 that the operator 236 may use to manually edit the work orders 368 of the schedule table 360. For example, the options 382 may include a product line drop-down menu 384 for changing the product line identifier 374 of a particular work order 368. Additionally, the options 382 may include a quantity textbox 386 that may enable the operator 236 to change the quantity of a particular work order. Additionally, the options 382 may include a line sequence textbox 388 that may enable the operator 236 to adjust the line sequence 369 of a particular work order 368. The options 382 may also include a remove option 390 for removing a particular work order 368 from the prioritized schedule 362. The options 382 may also include a comment option 392 for adding a comment to a particular work order 368. It should be recognized that the editing interface 364 may include additional options 382 that may enable the operator 236 to manually adjust the work orders 368.

The executions table 365 may display one or more executions 366 of the iterative algorithm used by the scheduling application 260. The one or more executions 366 may include a current execution and past executions. Each execution 366 may include an execution efficiency 382, an execution start time 394, an execution end time 396, a job identifier 398, an iterative algorithm type 400, a job status 402, or a combination thereof. In some embodiments, the executions table 365 may display the progress of a plurality of concurrently running executions 366. It should be recognized that the execution table 364 may include additional information pertaining to the executions 366.

It should be recognized that while the illustrated embodiment shows the schedule table 360, the editing interface 364, and the executions table 365 on the same screen 358, the scheduling application 260 may display each of these tables on separate screens. Additionally or alternatively, the screen 358, via the scheduling application 260, may display any combination of the schedule table 360, the editing interface 364, and the executions table 365.

Figure 7:
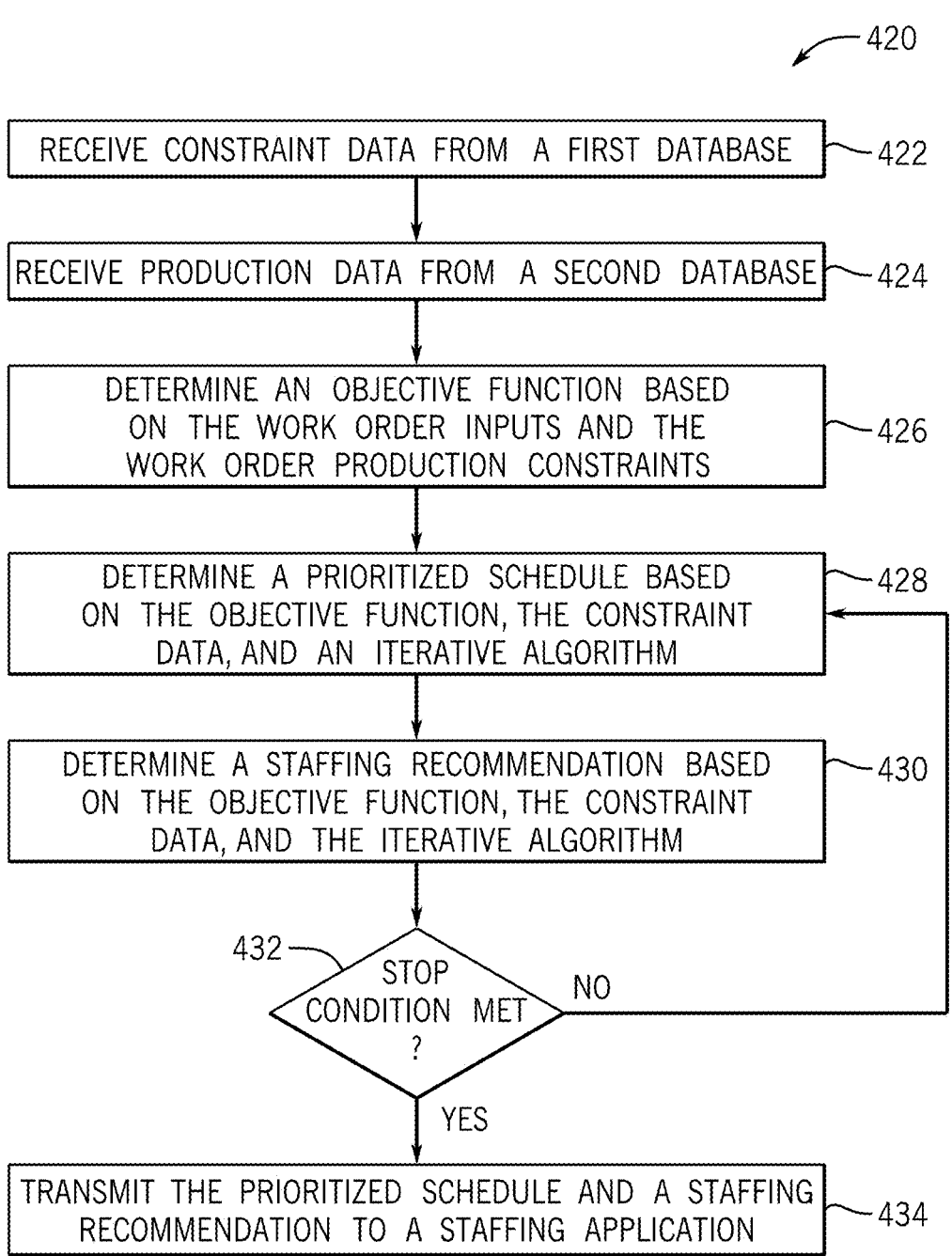
FIG. 7 is a flowchart illustrating a process performed by the scheduling application of FIG. 4, in accordance with aspects of the present disclosure.

Referring now to FIG. 7, the scheduling application may perform a method 420 for generating the staffing recommendation and the prioritized schedule. The method 420 may be performed by a computing device or controller disclosed above with reference to FIG. 1 or any other suitable computing device(s) or controller(s). Furthermore, the steps of the method 420 may be performed in the order disclosed herein or in any other suitable order. For example, certain steps of the method may be performed concurrently. In addition, in certain embodiments, at least one of the steps of the method 420 may be omitted.

In step 422 of the method 420, the constraint data may be received from a first database. The first database may include a database included in the MES and/or another other suitable database. As discussed herein, the constraint data may include a load balancing scheme, constraint times, changeover times, shift times, a planned delivery date, part inventory (e.g., shortages), and/or a product line capability. The load balancing scheme may include a preferred distribution of an aggregate (e.g., combined) production capacity over multiple production lines. For example, if a production line is undergoing maintenance, it may be desired that the number of work orders completed by the production line (e.g., the production line load) be reduced and, in certain embodiments, the number of work orders of other productions lines be increased to account for the loss of production from the production line under maintenance. The constraint time may include the time for completing a longest step in a process for a single unit. The changeover time may include an amount of time between separate work orders. The planned delivery date may be the calendar date at which the product is to be delivered to the customer. Part inventory may include a number of parts that are currently available that are used to manufacture a work order. The product line capability may include a number of parts that may be produced by a production line in a certain amount of time and/or the type of part that a production line may produce. It should be recognized that the constraint data may include additional information related to production constraints.

In step 424 of the method 420, production data may be received from a second database. The second database may include a database included in the ERP and/or another suitable database. As discussed herein, the production data may include one or more parameters that relate to prioritization of work orders and materials. For example, the production data may include a work order priority, a material priority, and/or created and released work orders. The work order priority may include an index indicative of a level of urgency/importance of a particular work order. The material priority may include an index indicative of a level importance in regards to a particular material. For example, a material that has a greater demand may result in a higher material priority. It should be recognized that the production data may include additional information related to a prioritization of production.

In step 426 of the method 420, objective function(s) may be determined based on the production data and the constraint data. The objective function(s) may include one or more objective functions, with each objective function having an objective variable. Additionally, each of the objective functions may be linear or nonlinear. In certain embodiments, the objective function(s) may include a lateness objective variable, a changeover objective variable (e.g., number of changeovers, changeover time, etc.), and/or another suitable objective variable. Selection may be received via a user interface (e.g., from the operator) of one or more objective variables. For example, one or more objective variables may be received (e.g., via the processor). The objective function may then be determined via the processor based on the production data, the constraint data, and the received objective variables.

In step 428 of the method 420, the prioritized schedule may be determined based on the objective function(s), the constraint data, and an iterative algorithm. The iterative algorithm is based on simulated annealing algorithm but also incorporates some elements of genetic algorithm and additional logic to eliminate optimization iterations of infeasible solutions. It utilizes crossover operator, sorting operator, and grouping of part-families with empirical constants driving the randomness of these operators. Several iterations of tests were performed to fine-tune these constants. In certain embodiments, a user interface may be configured to receive inputs (e.g., by the operator) to select which type of iterative algorithm is used to determine the prioritized schedule. Prior to each iteration of the iterative algorithm, the method 420 may check whether a stop condition has been met. If the stop condition has not been met, the method 420 may proceed with executing the iteration.

In step 430 of the method 420, the staffing recommendation may be determined based on the objective function(s), the constraint data, and an iterative algorithm. The iterative algorithm may include a simulated annealing algorithm, a principal component analysis (PCA) algorithm, and/or another suitable algorithm. In certain embodiments, the user interface may be configured to receive input (e.g., from the operator) selecting which type of iterative algorithm is used to determine the prioritized schedule. Prior to each iteration of the iterative algorithm, the controller may check whether a stop condition has been met. If the stop condition has not been met, the method 420 may proceed with executing the iteration. The iterative algorithm used to determine the staffing recommendation may be the same or may be different than the iterative algorithm used for determining the prioritized schedule.

In step 432 of the method 420, the method 420 may determine whether the stopping condition associated with the iterative algorithm is met. The stopping condition may include an amount of time, a percent improvement of a solution determined by the iterative algorithm, or another suitable stopping condition. The user interface may receive inputs (e.g., from the operator) selecting the stopping condition prior to execution of the iterative algorithm. Additionally or alternatively, the user interface may receive inputs (e.g., from the operator) selecting an amount associated with the stopping condition (e.g., amount of time, amount of improvement, etc.). If the stopping condition is not met, the method 420 returns to step 428. For example, if an elapsed time has not surpassed a threshold amount of time, the method 420 returns to step 428. If the stop condition is met, the method 420 proceeds to step 434.

In step 434 of the method 420, the prioritized schedule and the staffing recommendation are transmitted to the staffing application in response to the stopping condition being met. Additionally, the prioritized schedule may be transmitted to the dashboards application in response to the stopping condition being met. It should be recognized that the prioritized schedule and/or the staffing recommendation may be transmitted to any other suitable application and/or database in response to the stopping condition being met.

In some embodiments, the computing device and/or controller may control, via the processor, the user interface to display the prioritized schedule in response to the stopping condition being met. The computing device and/or controller may receive a user input (e.g., via the editing interface) for modifying the prioritized schedule. In response to the operator modifying the prioritized schedule, the computing device and/or controller may control, via the processor, the user interface to display the modified prioritized schedule.

Figure 8:
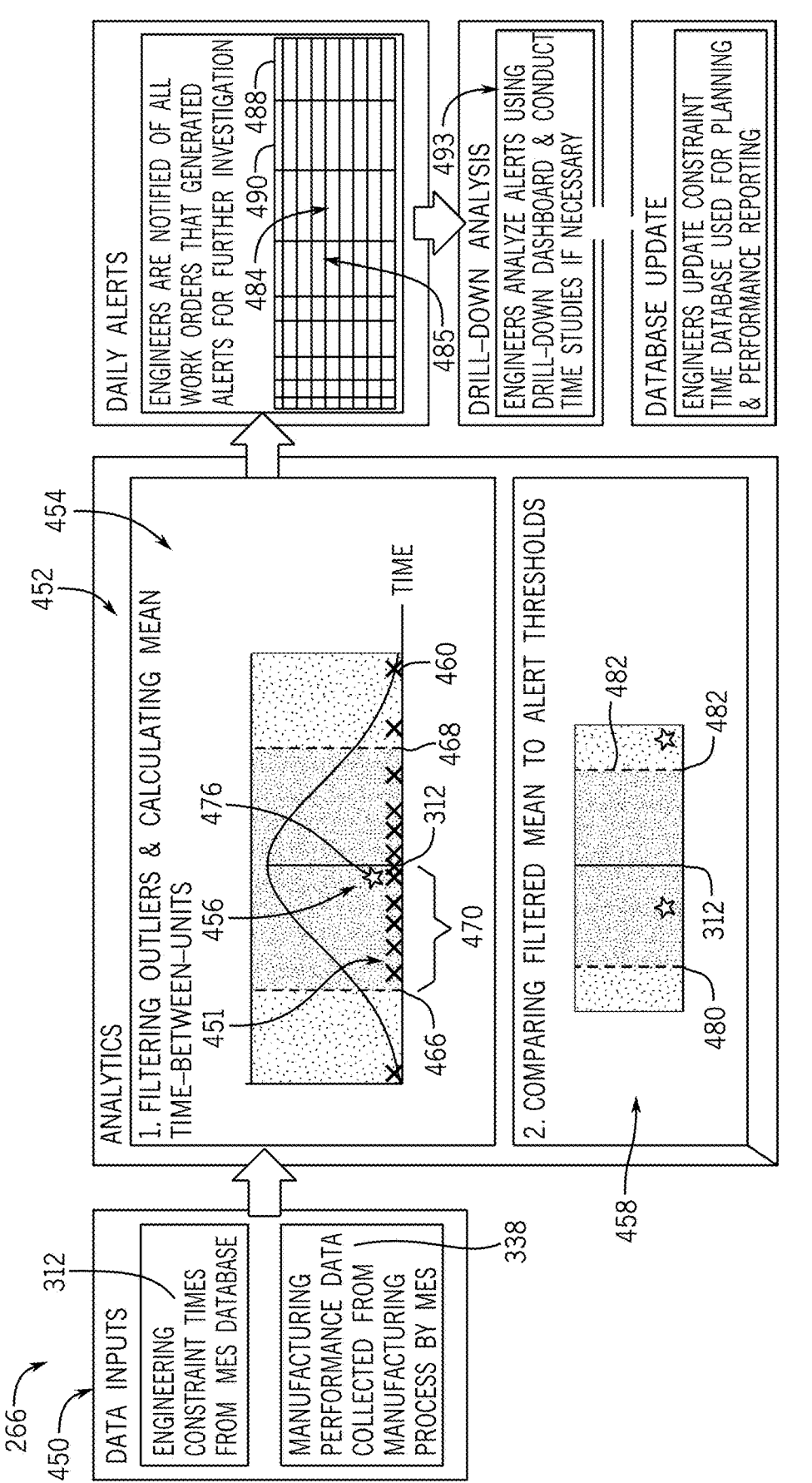
FIG. 8 is a schematic illustrating a process performed by the engineering application of FIG. 4, in accordance with aspects of the present disclosure.

Referring now to FIG. 8, the engineering application 266 may receive data inputs 450 from the MES. The data inputs 450 may include the constraint times 312 and the real-time performance data 338, which may be received from the production lines by the MES. The performance data 338 may include a plurality of production times 451. The engineering application 266 may proceed to an analytics procedure 452. The analytics procedure 452 may include a filtering step 454, a mean calculation 456, and a comparison step 458.

The filtering step 454 may include a filtering of outlier production times 460 based on a normal distribution of production times 462 having a distribution mean production time 464 equivalent to the constraint time 312 for a particular widget. As shown, the outlier production times 460 are determined based on a lower buffer limit 466 (e.g., lower buffer threshold) and an upper buffer limit 468 (e.g., upper buffer threshold). The lower buffer limit 466 and the upper buffer limit 468 may be computed by subtracting and adding, respectively, a buffer threshold 470 to the constraint time 312. As shown, the buffer threshold 470 may be computed by multiplying a buffer percent, a maximum batch size, and the constraint time 312. In some embodiments, the lower buffer limit 466 and/or the upper buffer limit 468 may be adjustable.

The mean calculation 456 may include a calculation of a mean production time 476 based on the plurality of production times 451. The outlier production times 460 are removed from the plurality of production times 451 prior to determining the mean production time 476. As shown, the mean production time 476 may not be the same as the constraint time 312, though in some scenarios these time values may be equivalent.

In the comparison step 458, the mean production time 476 is compared with alert thresholds 478. The alert thresholds 478 may be determined by multiplying the constraint time 312 by a percentage. For example, a low notification threshold 480 may be 95 percent of the constraint time 312 and a high notification threshold 482 may be 105 percent of the constraint time 312. As shown, if the mean production time 476 either falls below the low notification threshold 480 or exceeds the high notification threshold 482, a notification 484 (e.g., alert) may be triggered. If the mean production time 476 falls between the low notification threshold 480 and the high notification threshold 482, then the notification 484 may not be triggered. In some embodiments, the low notification threshold 480 and/or the high notification threshold 482 may be adjustable. For example, engineers may narrow the gap between the low notification threshold 480 and the high notification threshold 482 as a particular production line matures.

The engineering application 266 may provide notifications 484 (e.g., alerts) based on the mean production time 476 breeching an alert threshold 478. As shown, the notifications 484 may be presented in a notifications table 485, which may include work orders that were given the notification 484. The notifications table 485 may include other information associated with each work order that has a notification 484, including a notification reason 488, a notification creation time 490, the line identifier, and/or an operation identifier. The notification reason 488 may provide a reason that a particular work order 308 was tagged with the notification 484. The notification creation time 490 may provide a time at which the notification 484 was triggered for a particular work order.

The engineering application 266 may include a drill-down analysis 493, which may enable engineers to analyze the notifications 484 using a drill-down dashboard. The drill-down analysis 493 may enable the engineers to conduct time studies. The engineers may then proceed to update the constraint time 312 (e.g., stored in a database 290) used for planning and performance reporting. For example, if a particular work order receives repeated notifications 484, the engineers may decide to increase the constraint time 312 for completing the work order.

Figure 9:
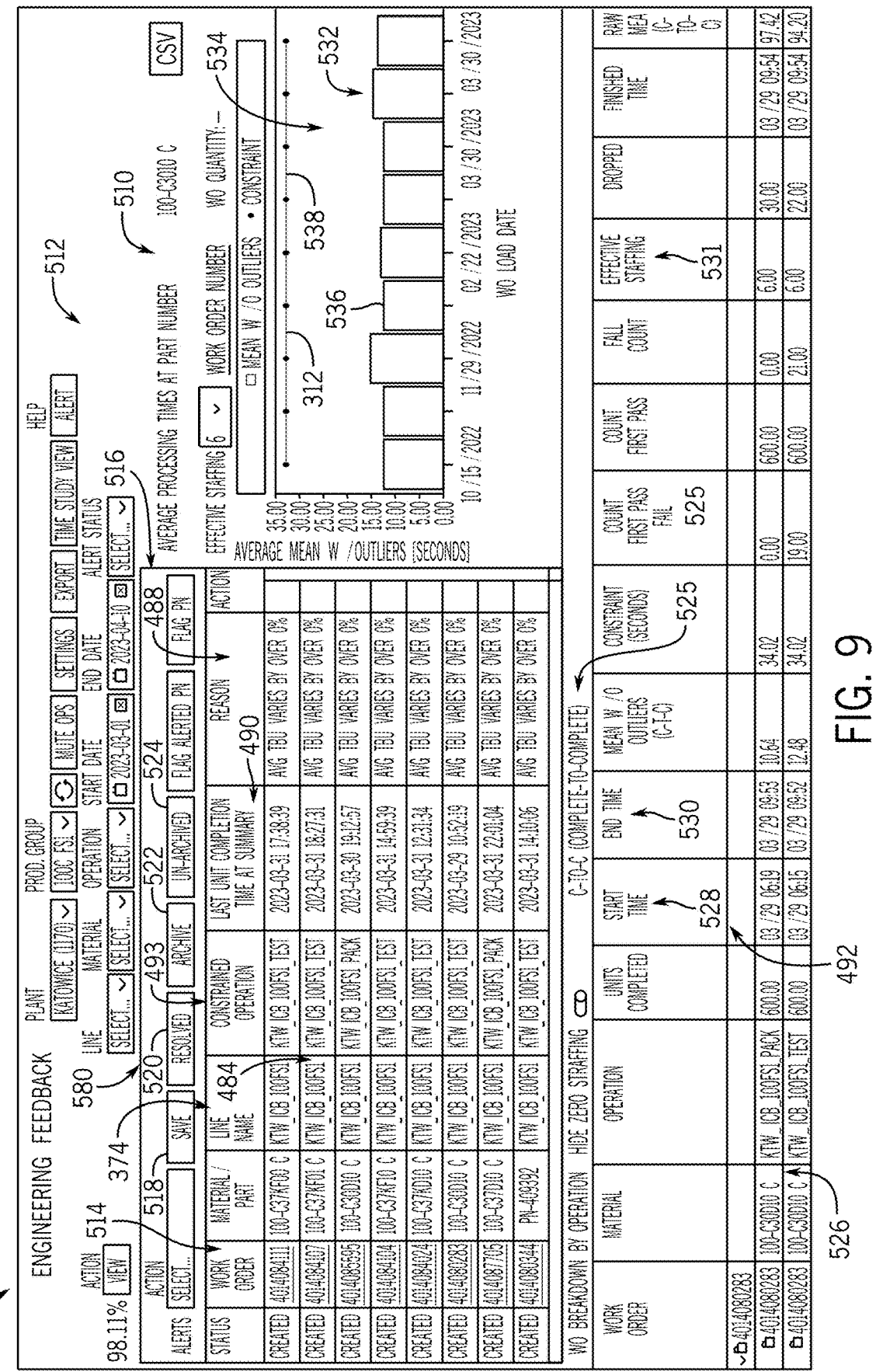
FIG. 9 is a schematic illustrating a display having data generated by the engineering application of FIG. 4, in accordance with aspects of the present disclosure.

Referring now to FIG. 9, the engineering application 266 may display the notifications table 480 having the notifications 484 (e.g., alerts), the drill-down analysis 493, and/or a historical analysis 510 on a screen 512. As shown, the notifications table 480 may include the notification reason 488, the notification creation time 490, the line identifier 374, the operation identifier 492, and/or a work order identifier 514. As shown, the screen 512 may display one or more notification action buttons 516 along with the notifications table 480. The notification action buttons 516 may include a save notification button 518, a resolve notification button 520, an archive notification button 522, and/or an unarchive notification button 524. The save notification button 518 may enable the operator to save the notification 484. The resolve notification button 520 may enable the operator to resolve the notification 484. The archive notification button 522 may enable the operator to archive the notification 484. The unarchive notification button 524 may enable the operator to unarchive the notification 484.

The screen 512 may also include the drill-down analysis 493 corresponding to each notification 484. For example, in response to the operator selecting a particular notification 484 from the notifications table 480, the drill-down analysis 493 may display a drill-down table 525 having a plurality of operations 526. The drill-down analysis 493 may include the plurality of operations 526 for completing a particular work order 308, an operation start time 528, an operation end time 530, and an effective staffing 531. The effective staffing 531 may include a number of staff members who were scheduled to work on a particular operation of a work order. As discussed herein, the drill-down analysis 493 may enable the engineers to conduct time studies. The engineers may then proceed to update the constraint time 312 (e.g., stored in a database) used for planning and performance reporting. For example, if a particular work order receives repeated notifications 484, the engineers may decide to increase the constraint time 312 for completing the work order.

The screen 512 may also include the historical analysis 510. The historical analysis 510 may include a plurality of daily mean production times 532 (e.g., prior mean production times) of a particular work order 308 in the form of a bar graph 534. For example, each bar 536 of the bar graph 534 may represent a daily mean production time 532. Additionally, the bar graph 534 may include a line plot 538 reflective of the constraint time 312 (e.g., daily constraint time). The operator may use the bar graph 534 to compare the daily mean production time 532 to the constraint time 312.

Referring now to FIG. 10, the engineering application may perform a method 560 for generating the staffing recommendation and the prioritized schedule. The method 560 may be performed by a computing device or controller disclosed above with reference to FIG. 1 or any other suitable computing device(s) or controller(s). Furthermore, the steps of the method 560 may be performed in the order disclosed herein or in any other suitable order. For example, certain steps of the method may be performed concurrently. In addition, in certain embodiments, at least one of the steps of the method 560 may be omitted.

In step 562 of the method 560, the constraint data may be received from a first database. The first database may include a database included in the MES and/or another other suitable database. As discussed herein, the constraint data may include constraint times, changeover times, shift times, and/or a product line capability. The constraint time may include the time for completing a longest step in a process for a single unit. The changeover time may include an amount of time between separate work orders. The product line capability may include a number of parts that may be produced by a production line in a certain amount of time and/or the type of part that a production line may produce. It should be recognized that the constraint data may include additional information related to production constraints.

In step 564 of the method 560, a plurality of production times may be received from a second database. The second database may include a database included in the MES and/or another other suitable database. In some embodiments, the second database may be the same database as the first database. The plurality of production times may include a plurality of measured times (e.g., real-time performance data) for completing a particular work order. For example, each production time may include a duration measured from the time at which a work order is commenced to the time at which the work order is completed.

In step 566 of the method 560, outlier production times of the plurality of production times may be identified based on the constraint data. As discussed herein, the outlier production times may be identified based on a normal distribution of production times having a distribution mean production time equivalent to the constraint time for a particular work order. The outlier production times may be determined based on a lower buffer limit (e.g., lower buffer threshold) and an upper buffer limit of the normal distribution of production times. The lower buffer limit and the upper buffer limit may be determined by subtracting and adding, respectively, a buffer threshold to the constraint time. The buffer threshold may be determined by multiplying a buffer percent, a maximum batch size, and the constraint time. In some embodiments, the lower buffer limit and/or the upper buffer limit may be adjustable.

In step 568 of the method 560, the outlier production times may be removed from the plurality of production times. For example, production times that fall below the lower buffer limit (e.g., lower buffer threshold) or exceed the upper buffer limit may be removed from the plurality of production times. The remaining plurality of production times may be used for remaining computations.

In step 570 of the method 560, a mean production time is determined based on the plurality of production times. It should be recognized that the mean production time may be determined after the outlier production times have been removed from the plurality of production times. The mean production time may not be the same as the constraint time, though in some scenarios these time values may be equivalent.

In step 572 of the method 560, a notification is generated in response to the mean production time falls below the low notification threshold time or exceeds the high notification threshold time. The low notification threshold time and the high notification threshold time may be determined by multiplying the constraint time by a percentage. For example, the low notification threshold time may be 95 percent of the constraint time and the high threshold time may be 105 percent of the constraint time. If the mean production time either falls below the low notification threshold time or exceeds the high notification threshold time, a notification (e.g., alert) may be triggered. If the mean production time falls between the low notification threshold time and the high notification threshold time, then the notification may not be triggered. In some embodiments, the low notification threshold time and/or the high notification threshold time may be adjustable. For example, engineers may narrow the gap spanning between the low notification threshold time and the high notification threshold time as a particular production line matures. The computer network and/or controller may cause a user interface to display the generated notification. For example, the user interface may display a plurality of notifications corresponding to different work orders and/or product lines in a tabular format.

Figure 11:
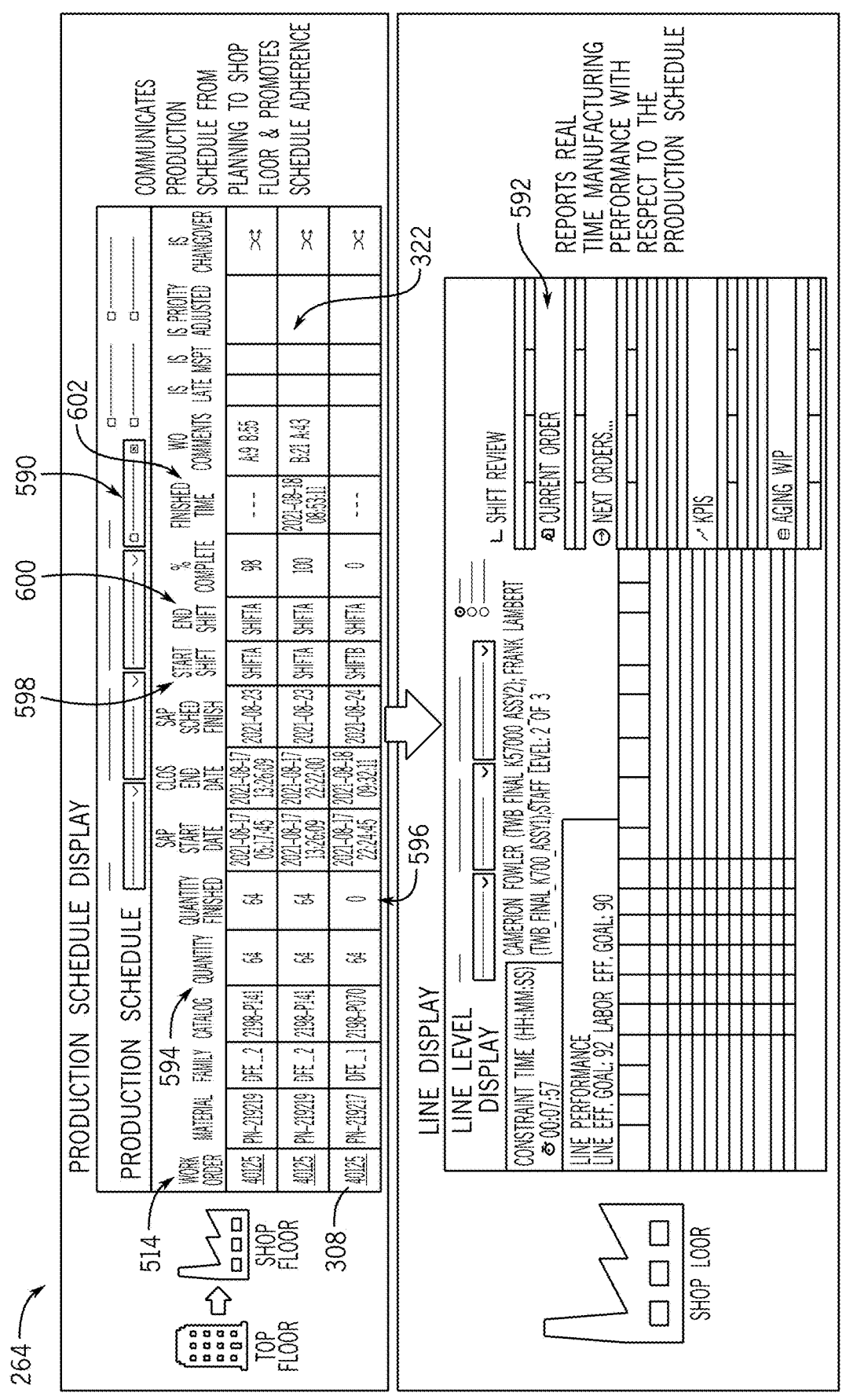
FIG. 11 is a schematic illustrating a production schedule display and a line display of the dashboards application of FIG. 4, in accordance with aspects of the present disclosure.

Referring now to FIG. 11, the dashboards application 264 may include a production schedule display 590 and a line display 592. The production schedule display 590 may communicate the prioritized schedule 322 from a planning department (e.g., management department) of a company to the OT environment. As shown, the production schedule display 590 may include the work order identifier 514, a goal quantity 594, a finished quantity 596, a start shift 598, an end shift 600, and/or a finish time 602. The goal quantity 594 may include a quantity of a particular widget that is to be produced for a particular work order 308. The finished quantity 596 may include a quantity of a particular widget that is currently completed for a particular work order 308. The start shift 598 may include an indicator of a particular shift (e.g., shift A, shift B, etc.) that begins working on a particular work order 308. The end shift 600 may include an indicator of a particular shift that finishes working on a particular work order 308. The finish time 602 may include a time at which a particular work order 308 was completed. The line display 592 may report real-time manufacturing performance with respect to the prioritized schedule 322. For example, the line display 592 may be displayed on one or more screens in the OT environment, such that one or more operators and/or their supervisors may assess their performance.

Figure 12:
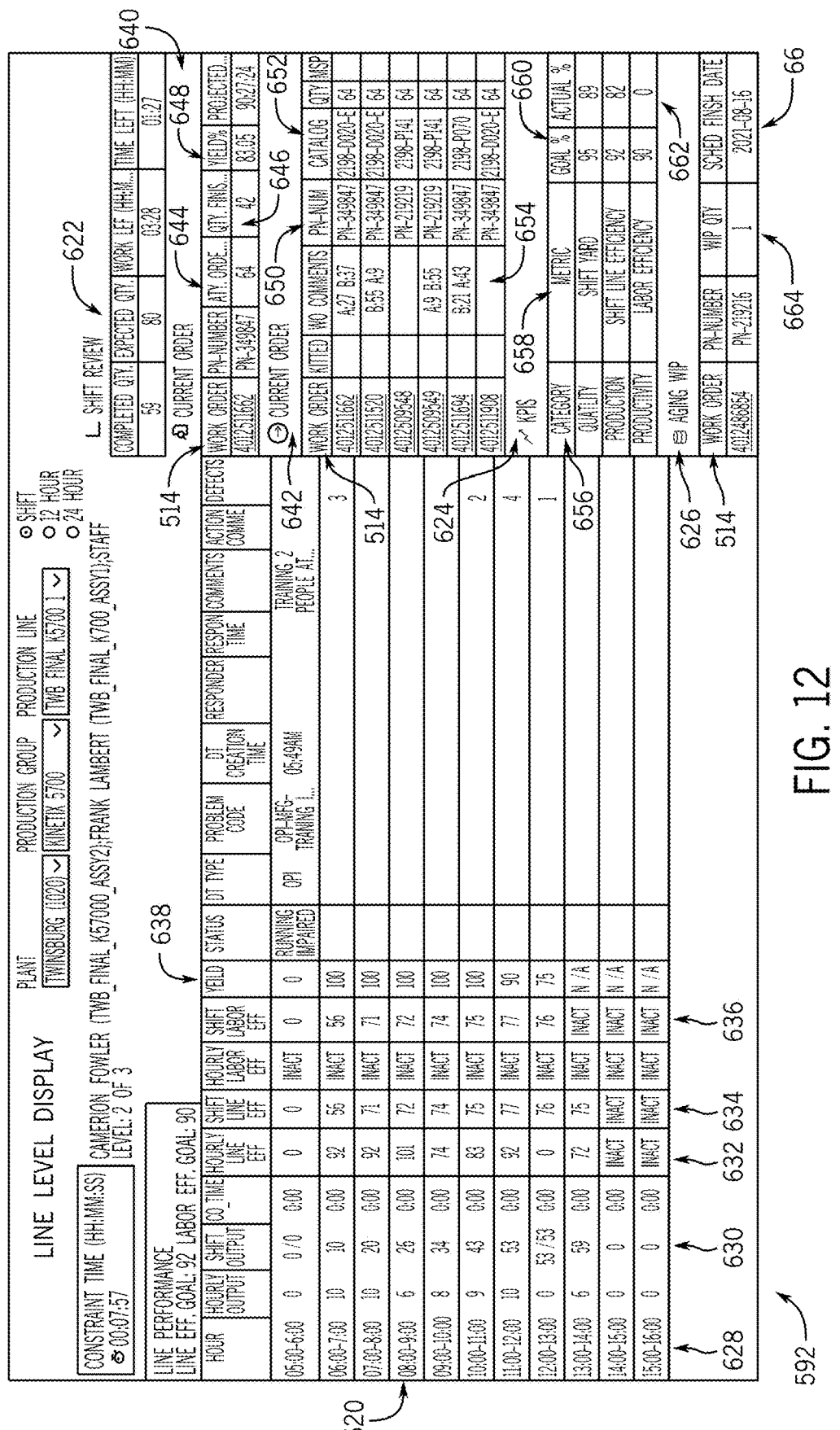
FIG. 12 is a schematic illustrating the line display of the dashboards application of FIG. 4, in accordance with aspects of the present disclosure.

Referring now to FIG. 12, the line display 592 may include a line performance table 620, a shift review table 622, a key performance indicator (KPI) table 624, and an aging work in progress (WIP) table 626. The line performance table 620 may include a shift time slot 628 (e.g., hourly time slot), a corresponding shift output 630, a corresponding hourly line effectiveness 632, a corresponding shift line effectiveness 634, a corresponding shift labor effectiveness 636, and/or a corresponding yield 638. The shift time slot 628 may designate a particular duration of time (e.g., 7 AM to 8 AM) corresponding to a particular production line. The shift output 630 may indicate a number of widgets completed on the particular production line during the shift time slot 628. The hourly line effectiveness 632 may include an index (e.g., score, rating) indicating an effectiveness of the particular production line during the shift time slot 628. The shift line effectiveness 634 may include an index indicating an effectiveness of a particular shift on the particular production line during the shift time slot 628. The shift labor effectiveness 636 may include an index indicating an effectiveness of labor (e.g., distribution of labor) during the shift time slot 628. The yield 638 may indicate a yield (e.g., percentage of goal output completed) during the shift time slot 628.

The shift review table 622 may include a current order 640 and a table of next orders 642. The current order 640 may include the work order identifier 514, an ordered quantity 644, a finished quantity 646, and/or a yield percentage 648. The ordered quantity 644 may include a number of a particular widget that was ordered for a particular work order. The finished quantity 646 may include the number of widgets for the particular work order that have been completed. The yield percentage 648 may indicate a percentage (e.g., real-time percentage) of the ordered quantity 644 that has been completed for the particular work order. The table of next orders 642 may include the work order identifier 514, a corresponding PN-number 650, a corresponding catalog identifier 652, and/or work order comments 654. The work order comments 654 may enable an operator to provide comments for custom changes and/or other custom instructs for certain work orders.

The KPI table 624 may include a KPI category 656, a KPI metric 658, a KPI goal percentage 660, and/or a KPI actual percentage 662. The KPI category 656 may indicate a category of a particular KPI (e.g., quality, production, productivity, etc.). The KPI metric 658 may indicate a metric used to measure the particular KPI (e.g., shift yield, shift line efficiency, labor efficiency, etc.). The KPI goal percentage 660 may include a goal metric percentage for a particular KPI. The KPI actual percentage 662 may include an actual KPI performance of the production line and corresponding operators.

The aging WIP table 626 may include the work order identifier 514, the PN-number 650, a WIP quantity 664, and a WIP scheduled finish date 666. The WIP quantity 664 may include a quantity of a particular widget for a particular work order that is still on the production line. The WIP scheduled finish date 666 may include a date by which the particular work order still being manufactured may be completed.

Figure 13:
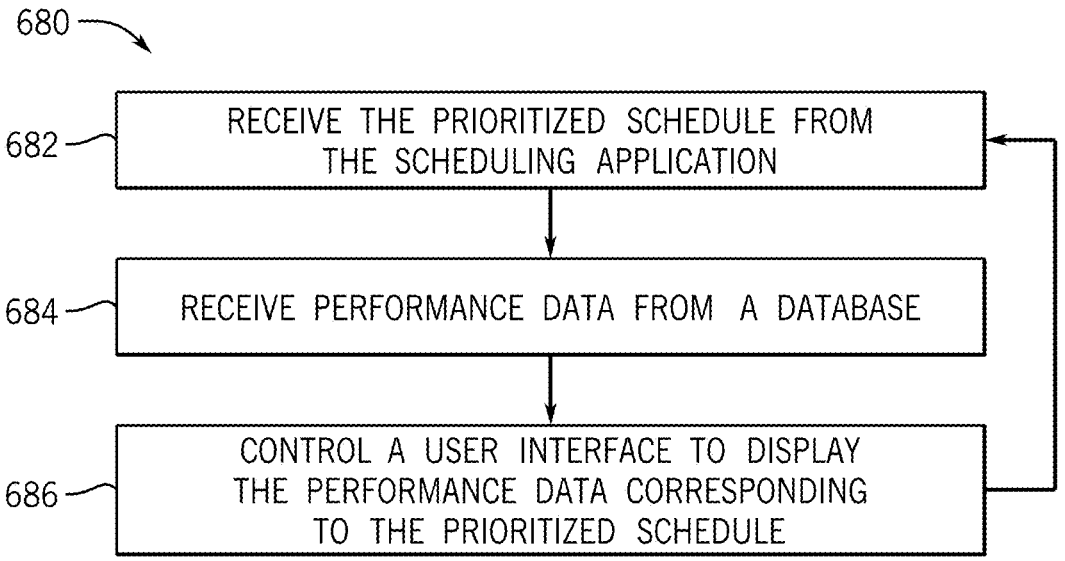
FIG. 13 is a flowchart illustrating a process performed by the dashboards application of FIG. 4, in accordance with aspects of the present disclosure.

Referring now to FIG. 13, the dashboards application may perform a method 680 for controlling a user interface to display data to one or more operators on the production lines. The method 680 may be performed by a computing device or controller disclosed above with reference to FIG. 1 or any other suitable computing device(s) or controller(s). Furthermore, the steps of the method 680 may be performed in the order disclosed herein or in any other suitable order. For example, certain steps of the method may be performed concurrently. In addition, in certain embodiments, at least one of the steps of the method 680 may be omitted.

In step 682 of the method 680, the dashboards application may receive the prioritized schedule generated by the scheduling application. The prioritized schedule, as discussed herein, may include a schedule of workorders that need to be completed. For example, the prioritized schedule may include a table (e.g., list, organization, etc.) of workorders for each product line of the industrial automation system.

In step 684 of the method 680, the dashboards application may receive performance data from a database. In certain embodiments, the database may belong to the MES. As discussed herein, the performance data may include one or more indicators of a current performance of the industrial automation system. For example, the real-time performance data may include the duration of time that was used by the operators to complete a particular work order.

In step 686 of the method 680, the dashboards application may control a user interface (e.g., monitors) to display the performance corresponding to the prioritized schedule. For example, as discussed herein, the dashboards application may control a user interface to display a production schedule display and/or a line display. The production schedule display may display a high-level schedule for completing the work orders and the current progress of each work order. The line level display may include a more detailed display of a performance of individual production lines. For example, as discussed herein, the line level display may display an hourly effectiveness of a particular production line for each work hour during a work day. It should be recognized that the dashboard application may update the user interface to display updated performance data. That is, in certain embodiments, in response to a completion of step 686, the method 680 may iterate back to step 682 in response to receiving an updated prioritized schedule and/or updated performance data, and control the user interface to display the updated prioritized schedule and/or the updated performance data.

Figure 14:
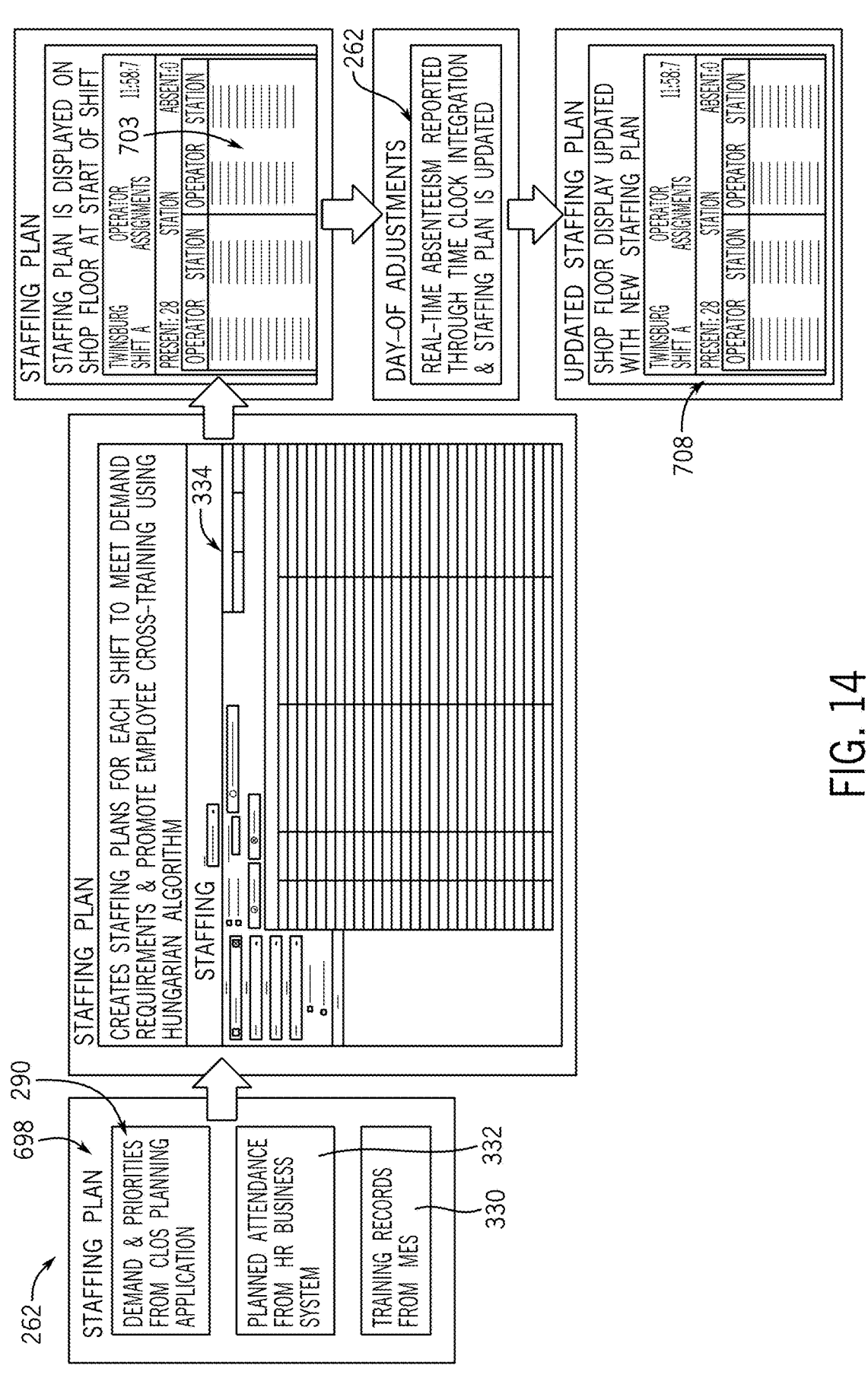
FIG. 14 is a schematic illustrating a process performed by the staffing application of FIG. 4, in accordance with aspects of the present disclosure.

Referring now to FIG. 14, the staffing application 262 may receive staffing data inputs 698 from one or more staffing databases 290. In the illustrated embodiment, the staffing application 262 receives data from the projected absences database 332 the certifications database 330. The staffing application 262 also receives the prioritized schedule and the staffing recommendation generated by the scheduling application. It should be recognized that the staffing application 262 may receive data from additional databases 290 (e.g., real-time attendance database) or additional applications.

As shown, the staffing application 262 creates the staffing plan 334 using the staffing data inputs 698. The staffing application 262 may create the staffing plan 334 using a Hungarian algorithm/Kuhn-Munkres Algorithm with unequal dimensions. The cost matrix is calculated using a custom logic taking into account factors like operator certification, line priority, cost center alignment, operator availability, historical data and more considerations. The application optimizes the resulting staffing plan for higher performance index adhering to business constraints. For example, the Hungarian algorithm may assign each operator of the available operators to a particular production line at a particular time to meet the demand recommendation specified by the staffing recommendation generated by the scheduling application. In certain embodiments, the staffing application 262 may use the Hungarian algorithm to promote operator cross-training. The Hungarian algorithm may, for example, increase a value indicative of an amount of cross-training between operators. For example, if a first operator has training with a first machine, but does not have training with a second machine, then the Hungarian algorithm may assign the first operator to work with a second operator who has training of using the second machine.

The staffing application 262 may send the staffing plan 334 to the dashboards application, which may control a user interface to display a simplified staffing plan 703 on the production lines (e.g., shop floor) of the OT environment at the beginning of each shift and, in certain embodiments, periodically during each shift. The manner in which the simplified staffing plan 703 is displayed is discussed further herein.

The staffing application 262 may perform day-of adjustments 704 to the staffing plan 334 based on real-time absenteeism determined based on data collected from the real-time attendance database 328. In certain embodiments, the real-time attendance database 328 may be updated via an integration with a time clock application used for tracking daily attendance of the operators. The staffing application 262 may update the staffing plan 334 based on the absence of one or more operators. For example, in response to an operator being absent, the staffing application 262 may re-run the Hungarian algorithm to re-assign one or more operators to different production lines. In certain embodiments, the staffing application 262 may perform day-of adjustments in response to a threshold number of absent operators. For example, the staffing application 262 may account for real-time absenteeism in response to more than 10 percent of the scheduled operators being absent on a given day. Furthermore, the staffing application 262 may periodically update the staffing plan 334 multiple times in a single day to account for absences that occur throughout the day. In certain embodiments, the staffing application 262 may update the staffing plan 334 at a given time interval. For example, the staffing application 262 may update the staffing plan 334 every 5 minutes, 10 minutes, 15 minutes, 30 minutes, hour, or 3 hours. In other embodiments, the staffing application 262 may update the staffing plan 334 in response to receiving an input from an administrator. The staffing application 262 may send an updated staffing plan 706 to the dashboards application, or any other suitable application, which may control one or more user interfaces disposed near the production lines (e.g., shop floor) to display a simplified updated staffing plan 708.

Referring now to FIG. 15, the staffing application 262 may display the staffing plan 334 on a user interface in the form of a staffing plan table 730. The staffing plan table 730 may include a plurality of staffing assignments 731. In the illustrated embodiment, each staffing assignment 731 is a row of the staffing plan table 730. Each staffing assignment 731 may include a date 732, the shift identifier 380, the product line identifier 374, an operator identifier 734 (e.g., operator name), and/or a work center identifier 736. The date 732 may identify a calendar date during which an operator is to work on a given production line. The work center identifier 736 may include a particular work center (e.g., building) and/or a particular location within the work center (e.g., work station) at which the operator is to work for a given shift.

As shown, the staffing application 262 may provide a staffing plan filter 738, which may allow an operator to query (e.g., filter) the staffing plan 334. For example, as shown in the illustrated embodiment, the staffing plan filter 738 may include a date filter 740, a shift filter 742, a work center filter 744, and/or a certificates filter 746. In response to an operator providing a particular date in the date filter 740, the staffing application 262 may display staffing assignments 731 which contain the particular date. Furthermore, in response to an operator providing a particular shift to the shift filter 742, the staffing application 262 may display staffing assignments 731 which contain the particular shift. The work center filter 744 and the certificates filter 746 may be used by an operator in a similar manner. It should be recognized that the staffing plan filter 738 may include any combination of the filters shown discussed herein, and/or additional or alternative filters.

In the illustrated embodiment, the staffing application 262 also includes a reassign option 748 and an unassign option 750 (e.g., remove option). The reassign option 748 may enable an administrator to manually reassign an operator to a different staffing assignment 731 based on special circumstances that may arise. That is, the Hungarian algorithm may, inadvertently, assign a particular operator to work on a particular production line on which the particular operator is unable to work. For example, the particular operator may be allergic to a certain material being used on the production line. In this scenario, the reassign option 748 may provide the administrator with the ability to reassign the particular operator to another production line. In a similar manner, the unassign option 750 may enable an administrator to manually unassign (e.g., remove) an operator from a staffing assignment 731. For example, if an operator unexpectedly moves to a different company division, the administrator may use the unassign option 750 to unassign the operator from one or more staffing assignments 731. In certain embodiments, the staffing application 262 may re-run the Hungarian algorithm, thereby generating a new staffing plan 334, after a threshold number of reassignments and/or unassignments (e.g., manual adjustments). For example, the staffing application 262 may re-run the Hungarian algorithm after 1, 2, 3, 4, 5, 10, 20, or 50 reassignments and/or unassignments.

Referring now to FIG. 16, the simplified staffing plan 703 displayed by the dashboards on the production lines throughout a work day includes a list (e.g., table) of staffing assignments 731 (e.g., operator assignments). As shown, the staffing assignments 731 displayed in the simplified staffing plan 703 include the operator identifier 734 (e.g., operator name) and an operator station identifier 770 (e.g., work center identifier). The operator identifiers 734 may be organized in an order that reduces the amount of time for operators to find their corresponding operator identifier. For example, as shown in the illustrated embodiment, the operator identifiers 734 may be arranged in alphabetical order by a surname of the operator. In the illustrated embodiment, letters 776 are positioned to the left of the operator identifiers 734 to further assisting operators in locating their operator identifier 734. As shown, the text of one or more of the operator station identifiers 770 may appear in a different color to convey a certain meaning. For example, a change in the color of the operator station identifier 770 may indicate a recent change of the corresponding staffing assignment 731.

The simplified staffing plan 703 may also include information regarding the attendance of the operators. As shown, the simplified staffing plan 703 includes an operator presence indicator 778 and an operator absence indicator 780, which indicate the number of scheduled operators who are present and absent, respectively. In certain embodiments, the summation of the numbers provided by the operator presence indicator 778 and the operator absence indicator 780 is equivalent to the total number of operator identifiers 734 displayed via the user interface.

Furthermore, the simplified staffing plan 703 may include additional information that may pertain to the staffing assignments 731. For example, the simplified staffing plan 703 may include the shift identifier 380 and/or a work center location identifier 782, which may identify a building or plant where the staffing assignments 731 may be located. Additionally, the simplified staffing plan 703 may include a current time 784.

Figure 17:
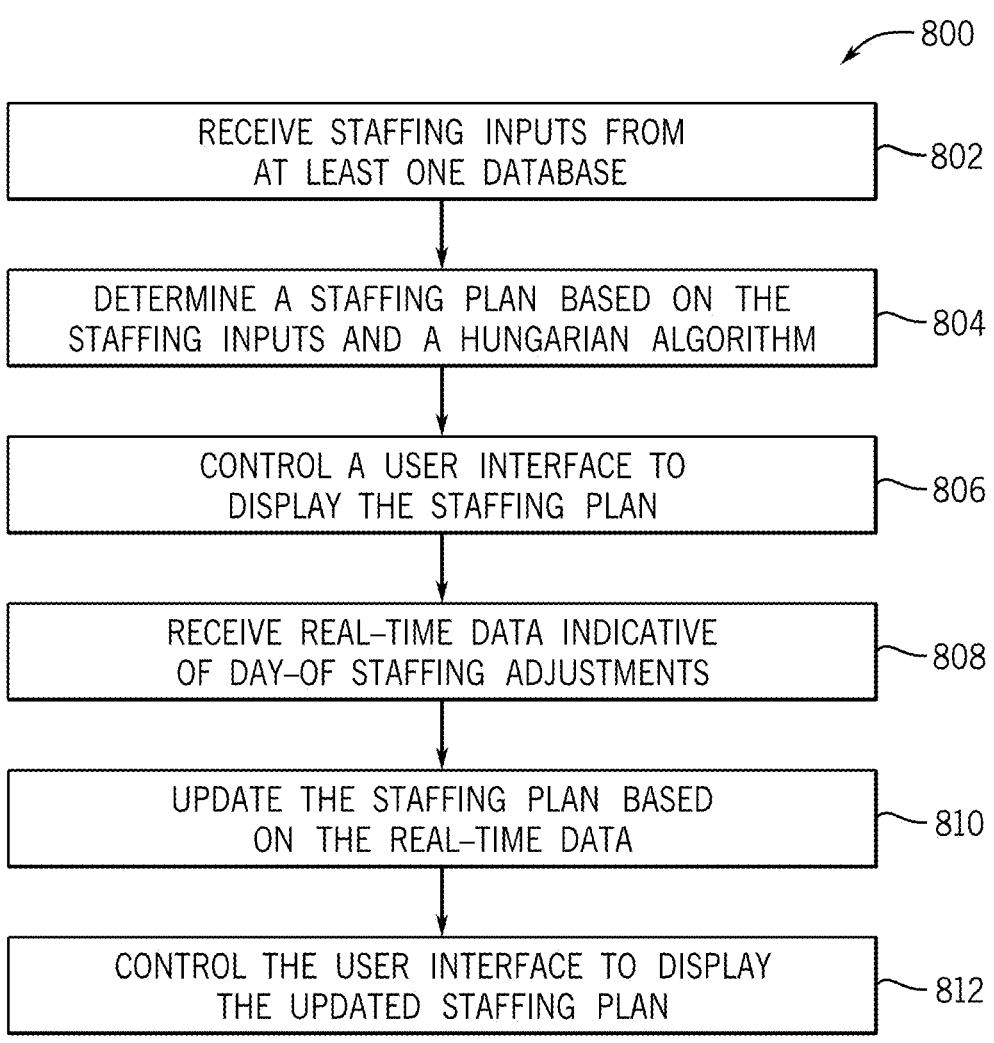
FIG. 17 is a flowchart illustrating a process performed by the staffing application of FIG. 4, in accordance with aspects of the present disclosure.

Referring now to FIG. 17, the staffing application may perform a method 800 for controlling a user interface to determining a staffing plan and controlling a user interface to display the staffing plan. The method 800 may be performed by a computing device or controller disclosed above with reference to FIG. 1 or any other suitable computing device(s) or controller(s). Furthermore, the steps of the method 800 may be performed in the order disclosed herein or in any other suitable order. For example, certain steps of the method may be performed concurrently. In addition, in certain embodiments, at least one of the steps of the method 800 may be omitted.

In step 802 of the method 800, the staffing application may receive staffing inputs from at least one database. As discussed herein, the staffing application may receive staffing inputs from a planned attendance database (e.g., projected absences database) and a training records database from the MES (e.g., certifications database). The staffing application may also receive the prioritized schedule and the staffing recommendation generated by the scheduling application. It should be recognized that the staffing application may receive data from additional databases or additional applications.

In step 804 of the method 800, the staffing application may determine a staffing plan based on the staffing inputs and a Hungarian algorithm. As discussed herein, the staffing application may determine the staffing plan using a Hungarian algorithm that assigns an operator to a particular production line and work order to increase a certain performance index. For example, the Hungarian algorithm may assign each operator of the available operators to a particular production line at a particular time to meet the demand recommendation specified by the staffing recommendation generated by the scheduling application. In certain embodiments, the staffing application may use the Hungarian algorithm to promote operator cross-training. For example, if a first operator has training with a first machine, but does not have training with a second machine, then the Hungarian algorithm may assign the first operator to work with a second operator who has training of using the second machine.

In step 806 of the method 800, the staffing application may control a user interface to display the staffing plan. As discussed herein, the staffing application may send the staffing plan to the dashboards application, which may control a user interface to display a simplified staffing plan on the production lines (e.g., shop floor) of the OT environment at the beginning of each shift and, in certain embodiments, periodically during each shift. In some embodiments, the staffing application may directly control a user interface to display the staffing plan without use of the dashboards application.

In step 808 of the method 800, the staffing application may receive real-time data indicative of day-of staffing adjusts. For example, the staffing application may receive real-time data from the real-time attendance database. In certain embodiments, the real-time attendance database may be updated via an integration with a time clock application used for tracking daily attendance of the operators. It should be recognized that the staffing application may receive real-time data from the real-time attendance database or any suitable database.

In step 810 of the method 800, the staffing application may update the staffing plan based on the received real-time data. For example, the staffing application may update the staffing plan based on the absence of one or more operators. For example, in response to an operator being absent, the staffing application may re-run the Hungarian algorithm to re-assign one or more operators to different production lines. In certain embodiments, the staffing application may perform day-of adjustments in response to a threshold number of absent operators. For example, the staffing application may account for real-time absenteeism in response to more than 10 percent of the scheduled operators being absent on a given day. Furthermore, the staffing application may periodically update the staffing plan multiple times in a single day or shift to account for absences that occur throughout the day. In certain embodiments, the staffing application may update the staffing plan at a given time interval. In other embodiments, the staffing application may update the staffing plan in response to receiving an input from an administrator.

In step 812 of the method 800, the staffing application may control the user interface to display the updated staffing plan. For example, the staffing application may send an updated staffing plan to the dashboards application, or any other suitable application, which may control one or more user interfaces disposed near the production lines (e.g., shop floor) to display a simplified updated staffing plan.

The present disclosure is directed to a production system for a manufacturing facility. The production system includes data-processing applications (e.g., data-processing suites) that receive data from databases and/or other data-processing applications and generate data to be output to databases, one or more end-users, and/or other data-processing applications. Specifically, the data-processing applications may include a scheduling application, a staffing application, a dashboards application, and an engineering application.

The scheduling application may receive data from a manufacturing execution system (MES) and/or an enterprise resource planning (ERP) application and use the received data to produce a recommended finite capacity prioritized schedule that maximizes output and customer schedule attainment given complex product mixes, time constraints, tooling recommendations, and production lines shift definitions. The scheduling application may send the staffing recommendation and the recommended finite capacity prioritized schedule to the staffing application and may additionally send the recommended finite capacity prioritized schedule to the dashboards application and/or the MES. In addition to receiving the staffing recommendation and the recommended finite capacity prioritized schedule from the scheduling application, the staffing application may receive data (e.g., staffing data) from one or more databases.

The engineering application may receive data directly from the MES and may receive data indirectly from the scheduling application. The engineering application may compare constraint times with performance data to provide engineers with an interface for monitoring whether the performance data meets the constraint times. The dashboards application may receive the recommended finite capacity prioritized schedule from the scheduling application and the performance data from the MES. The dashboards application may display the performance data (e.g., on the shop floor) for multiple time shifts of each employee, such that employees and/or employers may be able to visually analyze the performance of one or more production lines over a span of multiple time shifts. Accordingly, although the scheduling application, the staffing application, the dashboards application, and/or the engineering application may be designed to function as stand-alone applications, these applications may also interact with each other to enable the production system to respond more quickly to unforeseen changes and/or improve efficiency in the production workflow.

Technical effects of the disclosed embodiments include an improved production system for a manufacturing environment. The scheduling application disclosed herein more efficiently generates a prioritized schedule of work orders using an iterative algorithm (e.g., simulated annealing) on an objective function having multiple constraints, thereby greatly reducing the amount of time that would otherwise be needed to produce the prioritized schedule by hand. The staffing application disclosed herein more efficiently generates a staffing plan, which includes assignments of staff members to work stations. The staffing plan generates the staffing plan via a Hungarian algorithm, which accounts for day-of absenteeism and the certifications held by the staff members, thereby greatly reducing the amount of time that would otherwise be needed to generate a staffing plan that comparably meets the manufacturing demand. The engineering application improves the efficiency and gross output of the manufacturing environment by comparing mean production times (e.g., time of completion) to constraint production times, and generating notifications (e.g., feedback) when the mean production times do not satisfy the constraint production time. The engineering application increases an efficiency of production by aiding engineers in identifying the causes of lags in production and improves the overall output of the manufacturing environment by allowing engineers to monitor the productivity of production lines and alter the constraint times as needed, so as to increase the output of the manufacturing facility while not exceeding a capability of the production lines.

While the present disclosure may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is intended to cover all modifications, equivalents, and alternatives falling within the spirit and scope of the present disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
a controller comprising:
  a memory configured to store instructions; and
  one or more processors, wherein the controller is configured to:

receive a constraint time from a first database, wherein the constraint time comprises a time constraint for completing a work order;
  receive a plurality of production times from a second database, wherein the plurality of production times comprises a plurality of measured times for completing the work order;
  determine a lower constraint time limit and an upper constraint time limit based on the constraint time and a normal distribution of production times having a mean equivalent to the constraint time, wherein the lower constraint time limit and the upper constraint time limit are adjustable;
  identify one or more outlier production times of the plurality of production times based on the constraint time, wherein the one or more outlier production times comprise one or more production times that fall below the lower constraint time limit or exceed the upper constraint time limit;
  remove the one or more outlier production times from the plurality of production times;
  determine a mean production time based on the plurality of production times; and
  generate a notification in response to the mean production time exceeding an upper threshold time or falling below a lower threshold time, wherein the notification comprises a visual alert indicative that the mean production time exceeds the upper threshold time or falls below the lower threshold time.

2. The system of claim 1, wherein the controller is configured to determine the lower and upper threshold times based on the constraint time, wherein the lower and upper threshold times are adjustable.

3. The system of claim 1, wherein the controller is configured to determine the mean production time based on the plurality of production times, wherein the plurality of production times does not include the one or more outlier production times.

4. The system of claim 1, wherein the notification comprises a message to a user explaining a cause of the notification.

5. The system of claim 1, wherein the lower and upper threshold times are adjustable based on a maturity of a production line.

6. A method, comprising:
receiving, via a processor, a constraint time from a first database, wherein the constraint time comprises a time constraint for completing a work order;
receiving, via the processor, a plurality of production times from a second database, wherein the plurality of production times comprises a plurality of measured times for completing the work order;
determining, via the processor, a lower constraint time limit and an upper constraint time limit based on the constraint time and a normal distribution of production times having a mean equivalent to the constraint time, wherein the lower constraint time limit and the upper constraint time limit are adjustable;
identifying, via the processor, one or more outlier production times of the plurality of production times based on the constraint time, wherein the one or more outlier production times comprise one or more production times that fall below the lower constraint time limit or exceed the upper constraint time limit;

removing, via the processor, the one or more outlier production times from the plurality of production times;

determining, via the processor, a mean production time based on the plurality of production times; and generating, via the processor, a notification in response to the mean production time exceeding an upper threshold time or falling below a lower threshold time, wherein the notification comprises a visual alert indicative that the mean production time exceeds the upper threshold time or falls below the lower threshold time.

7. The method of claim 6, comprising determining, via the processor, the lower and upper threshold times based on the constraint time, wherein the lower and upper threshold times are adjustable.

8. The method of claim 6, comprising determining, via the processor, the mean production time based on the plurality of production times, wherein the plurality of production times does not include the one or more outlier production times.

9. The method of claim 6, wherein the notification comprises a message to a user explaining a reason for the notification.

10. The method of claim 6, wherein the lower and upper threshold times are adjustable based on a maturity of a production line.

11. A non-transitory computer-readable storage medium, comprising processor-executable routines that, when executed by a processor, cause the processor to perform operations comprising:

receiving a constraint time from a first database, wherein the constraint time comprises a time constraint for completing a work order;

receiving a plurality of production times from a second database, wherein the plurality of production times comprises a plurality of measured times for completing the work order;

determining a lower constraint time limit and an upper constraint time limit based on the constraint time and a normal distribution of production times having a mean equivalent to the constraint time, wherein the lower constraint time limit and the upper constraint time limit are adjustable;

identifying one or more outlier production times of the plurality of production times based on the constraint time, wherein the one or more outlier production times comprise one or more production times that fall below the lower constraint time limit or exceed the upper constraint time limit;

removing the one or more outlier production times from the plurality of production times;

determining a mean production time based on the plurality of production times; and generating a notification in response to the mean production time exceeding an upper threshold time or falling below a lower threshold time, wherein the notification comprises a visual alert indicative that the mean production time exceeds the upper threshold time or falls below the lower threshold time.

12. The non-transitory computer-readable storage medium of claim 11, comprising processor-executable routines that, when executed by the processor, cause the processor to perform operations comprising determining the lower and upper threshold times based on the constraint time, wherein the lower and upper threshold times are adjustable.

13. The non-transitory computer-readable storage medium of claim 11, comprising processor-executable routines that, when executed by the processor, cause the processor to perform operations comprising determining the mean production time based on the plurality of production times, wherein the plurality of production times does not include the one or more outlier production times.

14. The non-transitory computer-readable storage medium of claim 11, wherein the notification comprises a message to a user explaining a reason for the notification.

*    *    *    *    *